(12) United States Patent
Archer et al.

(10) Patent No.: US 12,384,328 B2
(45) Date of Patent: Aug. 12, 2025

(54) RESPONSE VEHICLE SYSTEMS AND METHODS

(71) Applicant: Oshkosh Corporation, Oshkosh, WI (US)

(72) Inventors: David W. Archer, Hortonville, WI (US); Neil Bjornstad, Oshkosh, WI (US); Michael J. Holeton, Appleton, WI (US); Patrick D. Martin, Appleton, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 18/744,005

(22) Filed: Jun. 14, 2024

(65) Prior Publication Data

US 2024/0326737 A1 Oct. 3, 2024

Related U.S. Application Data

(63) Continuation of application No. 18/093,600, filed on Jan. 5, 2023, now Pat. No. 12,049,190, which is a
(Continued)

(51) Int. Cl.
*B60R 25/08* (2006.01)
*A62C 27/00* (2006.01)
(Continued)

(52) U.S. Cl.
CPC .............. *B60R 25/08* (2013.01); *A62C 27/00* (2013.01); *B60Q 1/46* (2013.01); *B60R 25/06* (2013.01); *B60R 25/23* (2013.01); *B60R 25/24* (2013.01); *B60R 25/25* (2013.01); *G07C 5/008* (2013.01); *G07C 5/0825* (2013.01);
(Continued)

(58) Field of Classification Search
CPC ..... B60R 25/06; B60R 25/063; B60R 25/066; B60R 25/08; B60R 25/083; B60R 25/086; B60R 25/23; B60R 25/24; B60R 25/25; B60R 25/252; B60R 25/255; A62C 27/00
See application file for complete search history.

(56) References Cited

U.S. PATENT DOCUMENTS

| | | |
|---|---|---|
| 3,612,619 A | 10/1971 | Hayes |
| 3,790,223 A | 2/1974 | Fontaine |

(Continued)

FOREIGN PATENT DOCUMENTS

| | | |
|---|---|---|
| CA | 2805995 | 11/2013 |
| CN | 202183043 | 4/2012 |

(Continued)

OTHER PUBLICATIONS

International Search Report and Written Opinion for PCT application No. PCT/US2016/027169, dated Jul. 1, 2016, 14 pages.

*Primary Examiner* — Laura Freedman
(74) *Attorney, Agent, or Firm* — Foley & Lardner LLP

(57) ABSTRACT

A response vehicle system includes a non-transitory computer-readable storage medium having instructions stored thereon that, upon execution by one or more processors, cause the one or more processors to determine whether a response vehicle has arrived at a scene and provide a signal to switch the response vehicle from an operational condition to a locked condition at least in response to the vehicle arriving at the scene, thereby preventing undesired operation of the response vehicle.

11 Claims, 14 Drawing Sheets

Related U.S. Application Data continuation of application No. 17/229,253, filed on Apr. 13, 2021, now Pat. No. 11,577,689, which is a continuation of application No. 16/208,002, filed on Dec. 3, 2018, now Pat. No. 10,981,538, which is a continuation of application No. 15/097,278, filed on Apr. 12, 2016, now Pat. No. 10,144,389.

(60) Provisional application No. 62/150,149, filed on Apr. 20, 2015.

(51) Int. Cl.
| | | |
|---|---|---|
| *B60Q 1/46* | (2006.01) | |
| *B60R 21/00* | (2006.01) | |
| *B60R 25/06* | (2006.01) | |
| *B60R 25/23* | (2013.01) | |
| *B60R 25/24* | (2013.01) | |
| *B60R 25/25* | (2013.01) | |
| *G07C 5/00* | (2006.01) | |
| *G07C 5/08* | (2006.01) | |
| *G07C 9/00* | (2020.01) | |

(52) U.S. Cl.
CPC .. *G07C 9/00571* (2013.01); *B60R 2021/0081* (2013.01); *G07C 2009/00769* (2013.01)

(56) References Cited

U.S. PATENT DOCUMENTS

| | | |
|---|---|---|
| 4,116,296 A | 9/1978 | Pleier et al. |
| 4,152,647 A | 5/1979 | Gladden et al. |
| 4,608,825 A | 9/1986 | Fontaine |
| 4,834,207 A | 5/1989 | Havenhill et al. |
| 4,892,014 A | 1/1990 | Morell et al. |
| 5,079,435 A | 1/1992 | Tanaka |
| 5,204,670 A | 4/1993 | Stinton |
| 5,450,920 A | 9/1995 | Enk et al. |
| 5,505,528 A | 4/1996 | Hamman et al. |
| 5,513,244 A | 4/1996 | Joao et al. |
| 5,533,795 A | 7/1996 | Brooks |
| 5,538,274 A | 7/1996 | Schmitz et al. |
| 5,820,150 A | 10/1998 | Archer et al. |
| 5,835,868 A | 11/1998 | Mcelroy et al. |
| 5,890,080 A | 3/1999 | Coverdill et al. |
| 5,897,123 A | 4/1999 | Cherney et al. |
| 6,105,984 A | 8/2000 | Schmitz et al. |
| D460,950 S | 7/2002 | Miller et al. |
| 6,421,593 B1 | 7/2002 | Kempen et al. |
| 6,516,914 B1 | 2/2003 | Andersen et al. |
| 6,520,494 B1 | 2/2003 | Andersen et al. |
| 6,553,290 B1 | 4/2003 | Pillar |
| 6,561,718 B1 | 5/2003 | Archer et al. |
| 6,636,790 B1 | 10/2003 | Lightner et al. |
| 6,757,597 B2 | 6/2004 | Yakes et al. |
| 6,758,298 B2 | 7/2004 | Eberling et al. |
| 6,764,085 B1 | 7/2004 | Anderson |
| 6,779,806 B1 | 8/2004 | Breitbach et al. |
| 6,816,059 B2 | 11/2004 | Yanaka |
| 6,860,332 B1 | 3/2005 | Archer et al. |
| 6,882,917 B2 | 4/2005 | Pillar et al. |
| 6,883,815 B2 | 4/2005 | Archer |
| 6,885,920 B2 | 4/2005 | Yakes et al. |
| 6,909,944 B2 | 6/2005 | Pillar et al. |
| 6,922,615 B2 | 7/2005 | Pillar et al. |
| 6,976,688 B2 | 12/2005 | Archer et al. |
| 6,993,421 B2 | 1/2006 | Pillar et al. |
| 7,006,902 B2 | 2/2006 | Archer et al. |
| 7,024,296 B2 | 4/2006 | Squires et al. |
| 7,034,678 B2 | 4/2006 | Burkley et al. |
| 7,055,880 B2 | 6/2006 | Archer |
| 7,072,745 B2 | 7/2006 | Pillar et al. |
| 7,092,803 B2 | 8/2006 | Kapolka et al. |
| 7,107,129 B2 | 9/2006 | Rowe et al. |
| 7,113,127 B1 | 9/2006 | Banet et al. |
| 7,127,331 B2 | 10/2006 | Pillar et al. |
| 7,149,197 B2 | 12/2006 | Garahi et al. |
| 7,162,332 B2 | 1/2007 | Pillar et al. |
| 7,164,977 B2 | 1/2007 | Yakes et al. |
| 7,184,862 B2 | 2/2007 | Pillar et al. |
| 7,184,866 B2 | 2/2007 | Squires et al. |
| 7,207,582 B2 | 4/2007 | Siebers et al. |
| 7,234,534 B2 | 6/2007 | Froland et al. |
| 7,254,468 B2 | 8/2007 | Pillar et al. |
| 7,274,976 B2 | 9/2007 | Rowe et al. |
| 7,274,979 B2 | 9/2007 | Fujioka |
| 7,277,782 B2 | 10/2007 | Yakes et al. |
| 7,302,320 B2 | 11/2007 | Nasr et al. |
| 7,379,797 B2 | 5/2008 | Nasr et al. |
| 7,387,348 B2 | 6/2008 | Archer et al. |
| 7,389,826 B2 | 6/2008 | Linsmeier et al. |
| 7,392,122 B2 | 6/2008 | Pillar et al. |
| 7,412,307 B2 | 8/2008 | Pillar et al. |
| 7,439,711 B2 | 10/2008 | Bolton |
| 7,451,028 B2 | 11/2008 | Pillar et al. |
| 7,472,914 B2 | 1/2009 | Anderson et al. |
| 7,522,979 B2 | 4/2009 | Pillar |
| 7,555,369 B2 | 6/2009 | Pillar et al. |
| 7,689,332 B2 | 3/2010 | Yakes et al. |
| 7,705,777 B2 | 4/2010 | Sanderford et al. |
| 7,711,460 B2 | 5/2010 | Yakes et al. |
| 7,715,962 B2 | 5/2010 | Rowe et al. |
| 7,725,225 B2 | 5/2010 | Pillar et al. |
| 7,729,831 B2 | 6/2010 | Pillar et al. |
| 7,751,778 B1 | 7/2010 | Ngan |
| 7,756,621 B2 | 7/2010 | Pillar et al. |
| 7,761,544 B2 | 7/2010 | Manasseh et al. |
| 7,784,554 B2 | 8/2010 | Grady et al. |
| 7,792,618 B2 | 9/2010 | Quigley et al. |
| 7,835,838 B2 | 11/2010 | Pillar et al. |
| 7,848,857 B2 | 12/2010 | Nasr et al. |
| 7,874,373 B2 | 1/2011 | Morrow et al. |
| 8,000,850 B2 | 8/2011 | Nasr et al. |
| 8,050,811 B2 | 11/2011 | Inbarajan et al. |
| 8,086,368 B2 | 12/2011 | Petricoin et al. |
| 8,095,247 B2 | 1/2012 | Pillar et al. |
| 8,201,656 B2 | 6/2012 | Archer et al. |
| 8,212,667 B2 | 7/2012 | Petite et al. |
| 8,285,439 B2 | 10/2012 | Hodges |
| 8,333,390 B2 | 12/2012 | Linsmeier et al. |
| 8,376,077 B2 | 2/2013 | Venton-Walters |
| 8,402,878 B2 | 3/2013 | Schreiner et al. |
| 8,465,025 B2 | 6/2013 | Venton-Walters et al. |
| 8,520,700 B2 | 8/2013 | Greene et al. |
| D689,785 S | 9/2013 | Miller et al. |
| 8,525,660 B2 | 9/2013 | Miller et al. |
| 8,526,912 B2 | 9/2013 | Quade |
| 8,596,648 B2 | 12/2013 | Venton-Walters et al. |
| 8,645,014 B1 | 2/2014 | Kozlowski et al. |
| 8,670,879 B1 | 3/2014 | Angelucci |
| 8,670,897 B1 | 3/2014 | Ralson |
| 8,764,029 B2 | 7/2014 | Venton-Walters et al. |
| 8,786,423 B2 | 7/2014 | Miller et al. |
| 8,798,852 B1 | 8/2014 | Chen et al. |
| 8,801,017 B2 | 8/2014 | Ellifson et al. |
| 8,805,599 B2 | 8/2014 | Hibbert |
| 8,821,130 B2 | 9/2014 | Venton-Walters et al. |
| 8,838,325 B2 | 9/2014 | Tomik et al. |
| 8,839,902 B1 | 9/2014 | Archer et al. |
| 8,843,263 B2 | 9/2014 | Willard |
| 8,930,229 B2 | 1/2015 | Bowne et al. |
| 8,943,946 B1 | 2/2015 | Richmond et al. |
| 8,955,859 B1 | 2/2015 | Richmond et al. |
| 8,963,705 B2 | 2/2015 | Miller et al. |
| 8,967,699 B1 | 3/2015 | Richmond et al. |
| 8,991,834 B2 | 3/2015 | Venton-Walters et al. |
| 8,991,840 B2 | 3/2015 | Zuleger et al. |
| 9,002,569 B2 | 4/2015 | Tomik et al. |
| 9,016,703 B2 | 4/2015 | Rowe et al. |
| 9,045,014 B1 | 6/2015 | Verhoff et al. |
| 9,132,805 B1 | 9/2015 | King et al. |
| 9,239,000 B2 | 1/2016 | Barbour |
| 9,291,230 B2 | 3/2016 | Ellifson et al. |
| 9,302,129 B1 | 4/2016 | Betz et al. |

(56) References Cited

U.S. PATENT DOCUMENTS

| | | |
|---|---|---|
| 9,366,507 B1 | 6/2016 | Richmond et al. |
| 9,421,945 B1 | 8/2016 | Smathers |
| 9,586,568 B2 | 3/2017 | Geissenhoener |
| 10,144,389 B2 | 12/2018 | Archer et al. |
| 10,237,900 B2 | 3/2019 | Jackson et al. |
| 10,525,297 B2 | 1/2020 | Kay et al. |
| 10,685,510 B2 | 6/2020 | Linsmeier et al. |
| 10,981,538 B2 | 4/2021 | Archer et al. |
| 11,577,689 B2 | 2/2023 | Archer et al. |
| 12,049,190 B2 | 7/2024 | Archer et al. |
| 2001/0009394 A1 | 7/2001 | Yanaka |
| 2003/0034875 A1 | 2/2003 | Yamagishi et al. |
| 2003/0035437 A1 | 2/2003 | Garahi et al. |
| 2003/0141130 A1 | 7/2003 | Fleming et al. |
| 2005/0113996 A1 | 5/2005 | Pillar et al. |
| 2005/0221759 A1 | 10/2005 | Spadafora et al. |
| 2006/0271246 A1 | 11/2006 | Bell et al. |
| 2007/0294033 A1 | 12/2007 | Osentoski et al. |
| 2008/0082221 A1 | 4/2008 | Nagy |
| 2008/0103651 A1 | 5/2008 | Pillar et al. |
| 2008/0252487 A1 | 10/2008 | Mcclellan et al. |
| 2008/0284575 A1 | 11/2008 | Breed |
| 2008/0312786 A1 | 12/2008 | Day |
| 2009/0256690 A1 | 10/2009 | Golenski |
| 2011/0068895 A1 | 3/2011 | Gee et al. |
| 2011/0106374 A1 | 5/2011 | Margol et al. |
| 2012/0016558 A1 | 1/2012 | Ueno et al. |
| 2012/0303182 A1 | 11/2012 | Choi |
| 2012/0303212 A1 | 11/2012 | Miller et al. |
| 2013/0038444 A1 | 2/2013 | Miller et al. |
| 2013/0151065 A1 | 6/2013 | Ricci |
| 2013/0154820 A1 | 6/2013 | Miller et al. |
| 2013/0211623 A1 | 8/2013 | Thompson et al. |
| 2013/0254097 A1 | 9/2013 | Marathe et al. |
| 2013/0282238 A1 | 10/2013 | Ricci et al. |
| 2014/0011483 A1 | 1/2014 | Baumert et al. |
| 2014/0066132 A1 | 3/2014 | Burke et al. |
| 2014/0156111 A1 | 6/2014 | Ehrman |
| 2014/0195108 A1 | 7/2014 | Schumacher |
| 2014/0214261 A1 | 7/2014 | Ramamoorthy et al. |
| 2014/0277828 A1 | 9/2014 | Bullister et al. |
| 2014/0277844 A1 | 9/2014 | Luke |
| 2014/0303836 A1 | 10/2014 | Phelan |
| 2024/0326737 A1 | 10/2024 | Archer et al. |

FOREIGN PATENT DOCUMENTS

| | | |
|---|---|---|
| FR | 2739821 A1 | 4/1997 |
| FR | 3006648 A1 | 12/2014 |
| JP | S57-198119 A | 12/1982 |
| JP | 2003-256818 A | 9/2003 |
| JP | 2005-297796 A | 10/2005 |
| WO | WO-2005/006260 | 1/2005 |
| WO | WO-2014/186041 | 11/2014 |

RESPONSE VEHICLE SYSTEMS AND METHODS

CROSS-REFERENCE TO RELATED PATENT APPLICATIONS

This application is a continuation of U.S. patent application Ser. No. 18/093,600, filed Jan. 5, 2023, which is a continuation of U.S. patent application Ser. No. 17/229,253, filed Apr. 13, 2021, which is a continuation of U.S. patent application Ser. No. 16/208,002, filed Dec. 3, 2018, which is a continuation of U.S. patent application Ser. No. 15/097,278, filed Apr. 12, 2016, which claims the benefit of and priority to U.S. Provisional Patent Application No. 62/150,149, filed Apr. 20, 2015, all of which are incorporated herein by reference in their entireties.

BACKGROUND

Traditional response vehicles include various features and systems for assisting an operator of the response vehicle in responding to an incident. Such systems may provide navigation assistance, warning lights, and incident information. Operators are traditionally not able to wirelessly connect with an interface of the response vehicle, thereby preventing the operator from viewing information relating to the response vehicle and incident on a user device.

SUMMARY

One embodiment relates to a response vehicle. The response vehicle includes a transmission, a braking subsystem, and a vehicle management system coupled to at least one of the transmission and the braking subsystem. The vehicle management system includes an interlock module configured to provide a signal to switch the at least one of the transmission and the braking subsystem from a locked condition to an operational condition only in response to an authenticated user request thereby preventing undesired operation of the response vehicle.

Another embodiment relates to a response vehicle management system. The response vehicle management system includes a vehicle subsystem, a sensor, a transceiver, and a processing circuit. The vehicle subsystem includes at least one of a command system, a siren, a lighting system, a generator, a water pump system, a foam system, a water tank, a foam tank, a fuel tank, and a governor. The sensor is configured to monitor the vehicle subsystem and provide a sensor signal corresponding thereto. The processing circuit is coupled to the sensor and the transceiver. The processing circuit is configured to: (a) evaluate data relating to the vehicle subsystem based on the sensor signal and (b) provide the data for transmission by the transceiver in response to an authenticated user request.

Still another embodiment relates to a response vehicle control system. The response vehicle control system includes a response vehicle having a vehicle subsystem, a transceiver, and a processing circuit. The vehicle subsystem includes at least one of a command system, a siren, a lighting system, a generator, a water pump system, a foam system, and a governor. The processing circuit is coupled to the transceiver and configured to: (a) evaluate an access level of a user; (b) provide user interface data for transmission by the transceiver; (c) evaluate an authenticated command provided by the user; and (d) provide a control signal to the vehicle subsystem in response to the authenticated command, wherein the user interface data provided by the processing circuit varies based on the access level of the user thereby preventing unauthorized control of the response vehicle.

Another embodiment relates to a vehicle management system that includes a display module, a first user device coupled to the display module with a direct Wi-Fi connection, and a second user device coupled to the display module with the direct Wi-Fi connection. The display module is configured to store user interface data onboard the vehicle and provide the user interface data to the first user device and the second user device in response to a user request. The user interface data provided to the first user device and the second user device varies based on an access level of the user.

Still another embodiment relates to a response vehicle that includes a communications interface and a vehicle management system having an onboard communications module. The communications interface is configured to receive an incident signal from at least one of a mobile device and another response vehicle, and the onboard communications module includes a repeater module configured receive the incident signal and provide a relayed signal, thereby extending a transmission of the incident signal.

The invention is capable of other embodiments and of being carried out in various ways. Alternative exemplary embodiments relate to other features and combinations of features.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Systems and methods are described herein for providing various features as part of a response vehicle management system. More particularly, systems and methods are described for providing a response vehicle control and monitoring system. The response vehicle control and monitoring system includes a transceiver onboard the response vehicle configured to interface with a mobile device (e.g., a smartphone, tablet, laptop, etc.). The transceiver facilitates communication between the systems of the response vehicle and the mobile device, facilitating user control and monitoring of an incident and/or the response vehicle. The transceiver may interface with, for example, the drivetrain, command system, sirens, lighting, generators, and/or governors of the response vehicle. A user may monitor the health of the response vehicle, confirm that its systems are operating within normal parameters, and retrieve (e.g., view, download, etc.) vehicle diagnostics.

The user device may receive information from the response vehicle that is stored onboard the vehicle. The information may be provided as a webpage on the user device, eliminating the need for the user to download an application to interface with the response vehicle and allowing the user interface to be used across different user devices (e.g., on different platforms, on devices with different operating systems, etc.). The webpage content may be stored onboard the response vehicle.

In one embodiment, the communications system facilitates localized wireless communication between various response vehicles and other devices. For example, several response vehicles may respond to an incident and be spread out over a wide area around the incident. The communications systems of one response vehicle may facilitate communications with other, surrounding response vehicles and/or user devices. For example, a commander may be within wireless range of one response vehicle but not the other response vehicles. The communications systems of the response vehicles may act as repeaters, allowing the commander to communicate with each of the response vehicles, even those that are out of range of the commander's mobile device.

In one embodiment, the user devices communicate with the response vehicles via Wi-Fi. In other embodiments, the communications between the user devices and/or response vehicles may be supported via CDMA, GSM, or another cellular connection. In still other embodiments, another wireless protocol is utilized (e.g., Bluetooth, Zigbee, radio, etc.).

Figure 1:
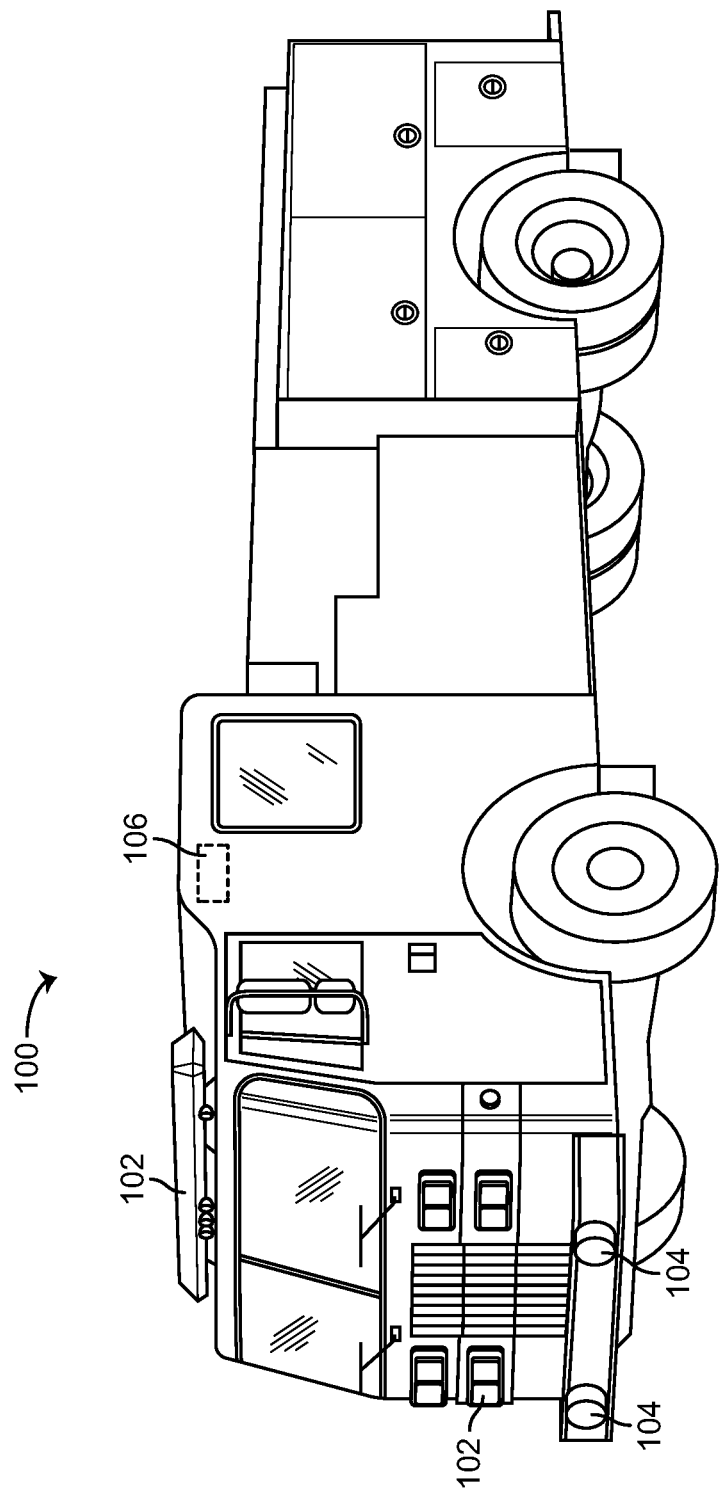
FIG. 1 is a perspective view of a response vehicle including various features described herein, according to an exemplary embodiment.

Referring to FIG. 1, a response vehicle 100, shown as a fire truck, includes a plurality of emergency lights 102 used to indicate the presence of vehicle 100 and any surrounding danger. Emergency lights 102 may be located in the front, back, and/or the top of the vehicle, or in any other location, to provide the clearest possible view of the lights. Vehicle 100 includes audio output devices (e.g., sirens, etc.), shown as speakers 104. Speakers 104 may be used to provide an audible warning. Emergency lights 102 and speakers 104 may include a transmitter, actuation of which provides a visual and an audible alert, respectively.

Vehicle 100 includes an onboard communications device 106 for transmitting and receiving data via a wireless connection. Communications device 106 facilitates wireless communication with various user devices and/or other vehicles 100. For example, communications device 106 may transmit response vehicle information to a user device of an occupant of the vehicle, to a commander on site at an incident, and/or to a system or person positioned remotely relative to an incident. Further, communications device 106 may facilitate transmissions between multiple response vehicles. In one embodiment, communications device 106 at least one of includes and acts as a repeater, facilitating transmission of signals from another source (e.g., a commander user device, etc.) to a device or response vehicle out of range of the original source.

While vehicle 100 is shown as a fire truck, it should be understood that the systems and methods disclosed herein are applicable to an ambulance, a police vehicle, a tow truck, a public utility vehicle, a municipal vehicle, a military vehicle, a lift device, or any other type of response vehicle or other vehicle. Further, the systems and methods disclosed herein may be applicable for any type of incident, scene, or site in which wireless communications between one or more vehicles and user devices is advantageous.

Figure 2:
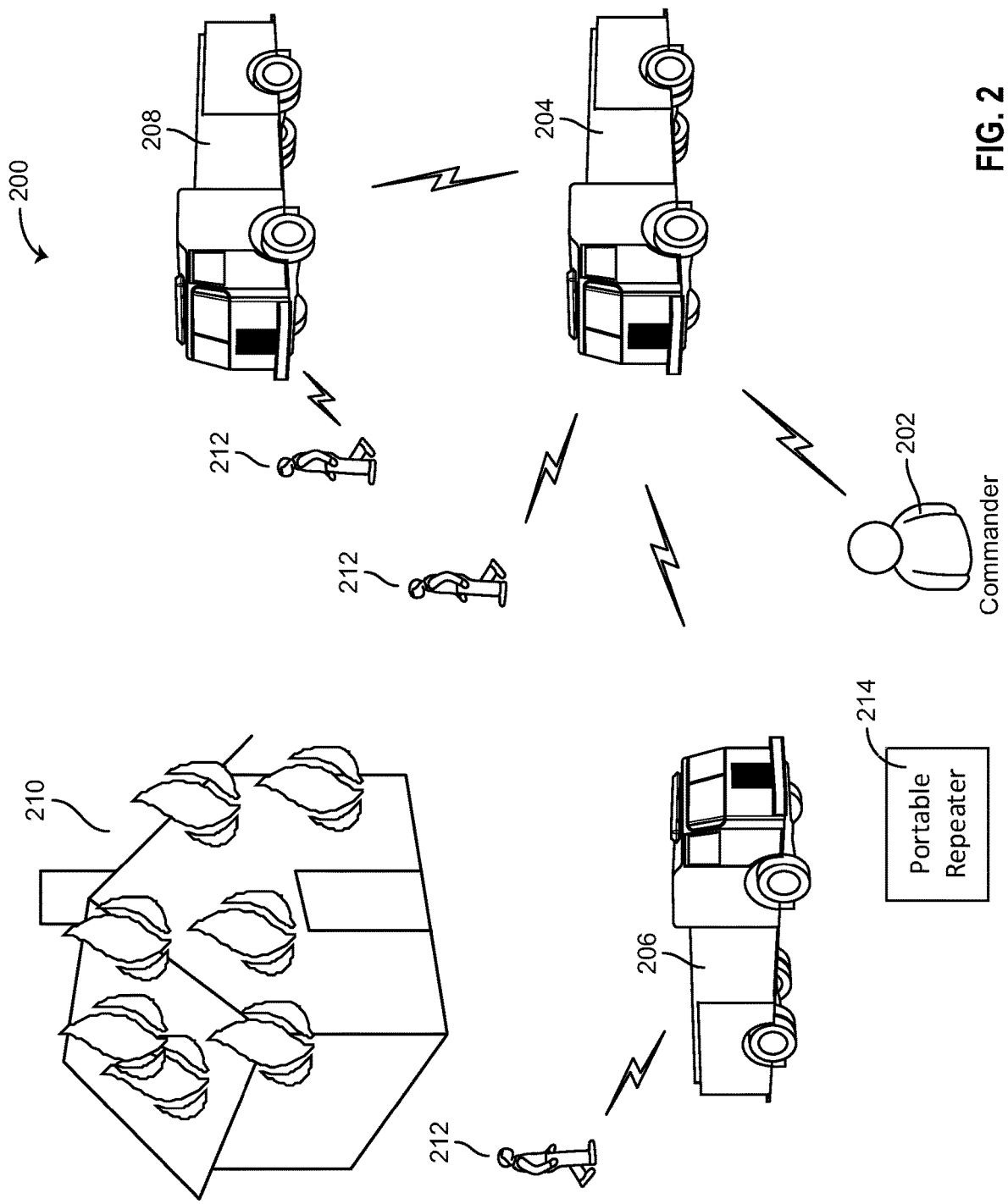
FIG. 2 is a schematic view of an exemplary incident, with several response vehicles responding to the incident, the response vehicles facilitating wireless communications between one another, a commander, and other users, according to an exemplary embodiment.

Referring to FIG. 2, an exemplary environment 200 includes a plurality of response vehicles that have responded to an incident. Response vehicles 204, 206, 208 are shown on site at an incident 210 (e.g., a house fire, etc.). A number of personnel 212 are shown on site as well. A commander 202 may be on site and responsible for managing the response to incident 210.

One or more of the response vehicles 204, 206, 208 may include an onboard communications device 106 facilitating communications between the response vehicles and user devices. For example, a response vehicle may be in range of one or more personnel 212 on site at incident 210, and may transmit information to and receive information from personnel user devices (e.g., mobile devices, etc.).

In one embodiment, the onboard communication devices of the response vehicles at least one of include and act as repeaters. For example, some response vehicles (e.g., response vehicle 208, etc.) may be out of the range of the user device of commander 202. The onboard communication device of response vehicle 204 may include or act as a repeater. Upon receiving a transmission from a user device of commander 202, the onboard communications device of response vehicle 204 may relay the transmission to response vehicles 206, 208. Response vehicles 206, 208 may then provide the transmission to personnel 212 in range, evaluate a vehicle or vehicle system command specified in the transmission, and/or perform still another task.

Similarly, since some response vehicles may be outside of the range of commander 202, the onboard communications device of response vehicle 204 may be used as a repeater to relay transmissions from the out of range response vehicles (e.g., vehicle 208, etc.) or personnel to a user device of commander 202. For example, response vehicle 204 may relay status information, warnings, and other information to commander 202 from response vehicle 208. Such communication may allow commander 202 to more effectively manage personnel and equipment on site.

In one embodiment, the information relayed between commander 202, personnel 212, and response vehicles 204, 206, 208 includes status information for the response vehicle. Status information may include, for example, general vehicle diagnostic activity (e.g., if fuel is low, if oil is low, other general vehicle-related errors, etc.), or information regarding various vehicle subsystems (e.g., water tank levels, pump operation, warning lights, sirens, navigation system, etc.). The information may be displayed on one or both of a display provided as part of the response vehicle and on a user device of commander 202 and/or personnel 212. In one embodiment, the information is transmitted to a user device and displayed on the user device in a webpage format. This information may be retrieved by the response vehicle from vehicle subsystems. For example, the information may be retrieved in real-time or near real-time as the vehicle is in operation (e.g., the vehicle is being driven or actively used in response to an incident, etc.). The commander may then use the information to manage use of the response vehicles at the incident. As another example, the information may be retrieved from vehicle subsystems in between incidents.

Figure 3:
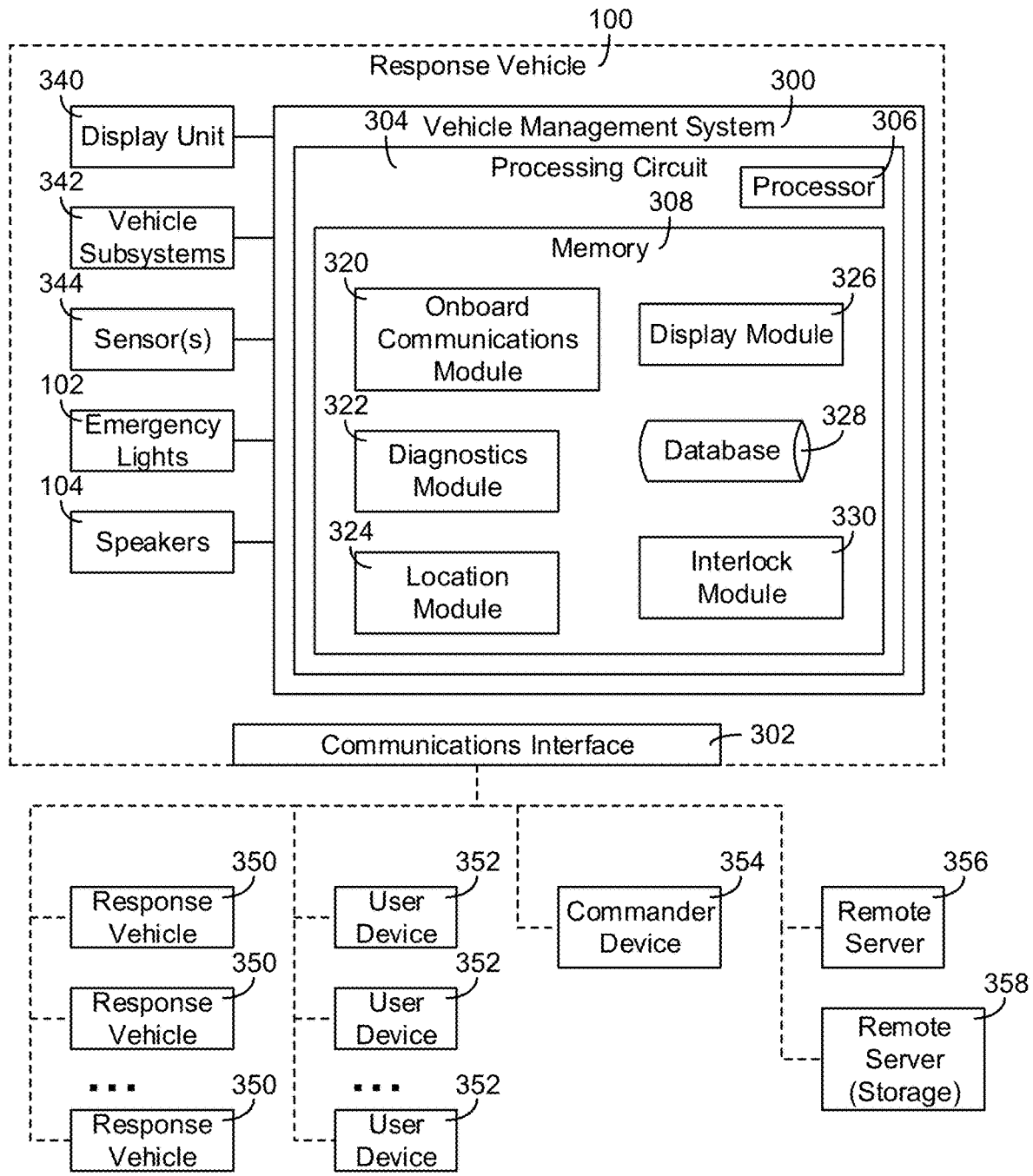
FIG. 3 is a block diagram of a vehicle management system for a response vehicle, according to an exemplary embodiment.

Referring now to FIG. 3, a vehicle management system 300 is provided as part of response vehicle 100. Vehicle management system 300 is generally configured to manage various aspects and features of the response vehicle. For example, vehicle management system 300 may facilitate communication between the response vehicle and other response vehicles and user devices. As another example, vehicle management system 300 may provide various data logging and diagnostic features, and may provide such information to user devices via a wireless connection and to a display unit of the response vehicle. As another example, vehicle management system 300 may monitor vehicle performance and determine any potential faults or warning associated with the vehicle, and wirelessly transmit the faults or warnings to a user device. As another example, vehicle management system 300 may facilitate integration of a navigation and mapping application, providing a display to a user that identifies points of interest in responding to an incident (e.g., location of hydrants, hazards, locations of other response vehicles, etc.). In some embodiments, vehicle management system 300 may be integrated with other vehicle systems of response vehicle 100. In other embodiments, some functionality of vehicle management system 300 may occur remotely from response vehicle 100 at a remote server or other device.

In one embodiment, response vehicle 100, and more particularly vehicle management system 300, is configured to wirelessly communicate with a plurality of other response vehicles 350, user devices 352, and/or at least one commander device 354. As described above with reference to FIG. 2, response vehicle 100 facilitates communication between various systems and devices. For example, response vehicle 100 may at least one of include and act as a repeater, allowing a signal from a first response vehicle 350 and/or user device 352 to reach other vehicles and/or devices out of range of the transmitting vehicle and/or device. Response vehicle 100 may be out of range of some of the devices and/or vehicles, and another response vehicle 350 may act as a repeater for transmitting a signal from response vehicle 100 to the out-of-range source.

In some embodiments, as shown in FIG. 2, one or more of the response vehicles 204, 206, 208 (and/or response vehicle 100) include a portable unit, shown as portable repeater 214. Portable repeater 214 may be releasably coupled to the chassis of a respective response vehicle and configured to be selectively deployed by a user (e.g., personnel 212, commander 202, etc.). The portable repeater 214 is configured to facilitate remote communication between the user and one or more response vehicles, according to an exemplary embodiment. For example, one or more portable repeaters 214 may be associated with a response vehicle and may be carried by a user. The user, if he/she is responding to an incident and has to walk far away from the response vehicle (e.g., the incident is in a rural place, etc.), may place the portable repeaters 214 out in the field. The portable repeaters 214 may then detect signals sent from either a user device or the response vehicle, and retransmit the signals at a power level greater than a power level of the received signals, facilitating wireless communications between the user and the response vehicle even if the user is out of wireless range (e.g., a distance beyond which wireless communication is not reliable, etc.) of the response vehicle. More than one portable repeater 214 may be used. The portable repeater 214 may be a battery-powered device and may be stored (and charged) in or on the response vehicle when not in use. The portable repeater 214 may be associated with the response vehicle such that the portable repeater 214 is configured for secure wireless communications with the response vehicle. In other words, communications may be secure between the user and the particular response vehicle. The response vehicle communications module may wirelessly transmit data to other user devices, a commander, other vehicles, etc.

As shown in FIG. 3, vehicle management system 300 includes a processing circuit 304 including a processor 306 and memory 308. Processor 306 may be a general purpose or specific purpose processor, an application specific integrated circuit (ASIC), one or more field programmable gate arrays (FPGAs), a group of processing components, or other suitable processing components. Processor 306 may be configured to execute computer code or instructions stored in memory 308 or received from other computer readable media (e.g., CDROM, network storage, a remote server, etc.) to perform one or more of the processes described herein. Memory 308 may include one or more data storage devices (e.g., memory units, memory devices, computer-readable storage media, etc.) configured to store data, computer code, executable instructions, or other forms of computer-readable information. Memory 308 may include random access memory (RAM), read-only memory (ROM), hard drive storage, temporary storage, non-volatile memory, flash memory, optical memory, or any other suitable memory for storing software objects and/or computer instructions. Memory 308 may include database components, object code components, script components, or any other type of information structure for supporting the various activities and information structures described in the present disclosure. Memory 308 may be communicably connected to processor 306 via processing circuit 304 and may include computer code for executing (e.g., by processor 306, etc.) one or more of the processes described herein.

As shown in FIG. 3, memory 308 includes an onboard communications module 320. Onboard communications module 320 is configured to facilitate wireless communications with user devices and with other response vehicles via communications interface 302 (e.g., transceiver, etc.). Communications interface 302 may support any kind of wireless standard (e.g., 802.11 b/g/n, 802.11a, etc.) and may interface with any type of mobile device (e.g., laptop, tablet, smartphone, etc.) having Wi-Fi capability. Communications interface 302 may further facilitate wireless communications with an external global positioning system (GPS). Onboard communications module 320 may be any type of Wi-Fi capable module (e.g., a CL-T04 CANect® Wi-Fi Module manufactured by HED Inc., etc.) configured to support wireless communications with the mobile devices and other response vehicles. Onboard communications module 320 may include various security features for providing secure communications between the response vehicles 350, user devices 352, and/or commander device 354. Such a module may further include other response vehicle-related features that may be used in the systems and methods disclosed herein (e.g., diagnostics features, navigation features, etc.). Onboard communications module 320 is described in greater detail below with reference to FIG. 4.

As shown in FIG. 3, memory 308 includes a diagnostics module 322. Diagnostics module 322 receives data relating to response vehicle operation (e.g., telemetry data, etc.) and provides diagnostic information to user devices. In various embodiments, some of the aspects of diagnostics module 322 may be integrated into the operation of onboard communications module 320 (e.g., onboard communications module 320 may include sub-modules for capturing telemetry data and transmitting data to the user devices, etc.); while the activities of diagnostics module 322 are described separately from the communications module 320 in the present disclosure, other embodiments having combined modules are within the scope of the present disclosure.

In one embodiment, diagnostics module 322 identifies an error or fault associated with the response vehicle based on telemetry data. The error or fault may be a specific error or fault instead of a generic warning. For example, instead of displaying a "check engine" light on a display of the response vehicle, a more specific fault message may be displayed that allows a user to more quickly diagnose and repair the problem. The fault message may be displayed on a display unit 340 of the response vehicle and/or on a user device 352 (e.g., transmitted to the user device by communications interface 302, etc.). Diagnostics module 322 is described in greater detail below with reference to FIG. 7. The fault message and/or diagnostic information may also be transmitted to a remote location (e.g., a central repair facility, etc.).

As shown in FIG. 3, memory 308 includes a location module 324 configured to provide located-related information for display on display unit 340 and/or a user device 352. Location module 324 may communicate with a remote server 356 to receive navigation and location information relevant to the response vehicle 100. For example, location module 324 may map a destination (e.g., the site of an incident, etc.) using obtained location or coordinate data, may provide turn-by-turn directions to an incident, and may provide geographical data relevant to the response vehicle 100 and incident (e.g., the location of hydrants and water points if the incident is a fire, etc.). In some embodiments, location module 324 and/or vehicle management system 300 are configured to function without connecting to remote server 356 (e.g., receive manual entry of an incident location and provide navigation information, etc.). Location module 324 is described in greater detail below with reference to FIG. 9.

As shown in FIG. 3, memory 308 includes a display module 326. Display module 326 is configured to generate a display to provide on display unit 340 of the response vehicle and/or a user device 352. Display unit 340 may be, for example, a touchscreen display (e.g., a CANlink® CL-711 display manufactured by HED Inc., etc.) having a resistive touchscreen that receives a touch input from a user. Display unit 340 may support any type of display feature, such as a flipbook-style animation, or any other type of transition feature. Display unit 340 may generally provide a plurality of navigation buttons that allow a user to select various displays and other options via touch. Display unit 340 may further, upon detection of a fault, provide a display that relates to the fault. For example, if a tire pressure fault is detected, a tire pressure screen may be displayed that provides current tire pressure information for the response vehicle. Display unit 340 may have a wired or wireless connection with other response vehicle subsystems and/or with remote devices. Display module 326 is described in greater detail with reference to FIG. 11.

As shown in FIG. 3, memory 308 includes a database 328 configured to store telemetry information captured by the various vehicle subsystems 342. Data may generally include telemetry data, diagnostics data, and access data. Telemetry data may include, for example, data relating to the operation of the response vehicle such as system statuses, HVAC status, the status of various vehicle subsystems and components (e.g., engine, transmission, tire pressure, brakes, pump(s), etc.), vehicle status (e.g., if a door is open, if equipment is deployed, etc.), etc. In other words, telemetry data includes vehicle status information that may be relevant to a commander or other user during a response to an incident and/or a maintenance technician. The data may be time stamped and include a vehicle identifier.

The data may be removed from database 328 once the data is uploaded from the local database to a remote cloud storage. For example, long-term storage of the telemetry data and other data may be done on a centralized server 358, and communications interface 302 may wirelessly connect with remote server 358 to transmit and store the data. As described above, the data includes a timestamp and vehicle identifier information to identify the data in remote server 358. Data may be stored in database 328 until transmission to remote server 358. The data may be kept in database 328 to allow for a "snapshot" view of the data on a user device (i.e., once the data is captured, the data may be provided shortly thereafter to user devices near the scene of an incident, etc.).

In one embodiment, the data is automatically updated periodically. The data may also be updated upon user request. A controller area network (CAN) controller, such as diagnostics module 322 or another module may be configured to monitor the data and to determine when a potential status of the response vehicle 100 has changed based on the telemetry data changes.

Database 328 may be any type of database (e.g., a SQLite database, etc.), and diagnostics module 322 may query the database using any type of language or method via backend framework. The backend framework of vehicle management system 300 may support the activities of periodically updating and querying database 328, as well as providing web layer authentication (e.g., to authenticate devices that attempt to access data from database 328, etc.). The backend framework may further support the various security-related functionality of onboard communications module 320.

Vehicle management system 300 may include, for example, a data transport protocol layer configured to facilitate the query of data from database 328 for use by the various modules of memory 308. In one embodiment, at least one of web sockets and AJAX polling is used to invoke queries via backend framework and provide the data to the frontend applications (e.g., the application layer, the modules, etc.), as they allow changes to database 328 to be detected and pushed to the application layer. The use of web sockets and/or AJAX may be based on compatibility constraints and performance constraints with the user devices 352 accessing vehicle management system 300. The application layer, or the frontend application, of vehicle management system 300 may be built using, for example, HTML5, CSS, and various Javascript libraries.

As shown in FIG. 3, memory 308 includes an interlock module 330. Interlock module 330 is configured to at least one of (i) prevent unintended, accidental, and/or unauthorized engagement and/or disengagement of one or more of the vehicle subsystems 342 (e.g., transmission, pumps, brakes, water system, foam system, lighting systems, sirens, engine, generator, etc.) and (ii) reduce the likelihood of theft of the response vehicle 100. For example, a response vehicle (e.g., a fire truck, an ambulance, a police vehicle, etc.) is often left running and unattended when the response vehicle arrives at the scene of an incident (e.g., a fire, a vehicle collision, etc.). Such an occurrence may leave traditional response vehicles prone to theft as anyone is able to enter the response vehicle and drive away.

The interlock module 330 may be configured to facilitate activating one or more interlocks that prevent the response vehicle and/or components thereof (e.g., water pump, foam system, sirens, lights, etc.) from being operated by an unauthorized user. For example, when arriving at a scene of an incident, an operator of the response vehicle 100 may be able to enter the response vehicle into a "scene mode" or "lock mode" using one or more commands (e.g., a user request, etc.) on the display unit 340, the user device 352 (e.g., a wireless control interface, etc.), the commander device 354 (e.g., a wireless control interface, etc.), and/or other input devices of the response vehicle 100 (e.g., switches, dials, toggles, parking brake, etc.). In some embodiments, interlock module 330 is configured to engage a parking brake and/or lock a transmission of the response vehicle 100 when the scene mode is activated. In other embodiments, the interlock module 330 is configured to activate the scene mode in response to the parking brake being activated (e.g., engaged, etc.) by an operator of the response vehicle 100. In still other embodiments, the interlock module 330 is configured to automatically enter the scene mode based on an indication relating to the response vehicle 100 arriving at a scene and/or automatically based on an indication relating to the presence of an operator (e.g., the lack of the presence of an operator, an operator exiting the response vehicle 100, an operator opening the door of the response vehicle 100, etc.). According to an exemplary embodiment, the interlock module 330 is configured to facilitate operation of at least one of an engine, a generator, a pump, a foam system, a water system, a siren, a lighting system, etc. while in the scene mode. According to an exemplary embodiment, such as system controlled by the interlock module 330 does not require modification to Federal Motor Vehicle Safety Standards ("FMVSS") brake circuit control of parking brakes.

According to an exemplary embodiment, activating the scene mode prevents an operator from shifting the transmission of the response vehicle 100 from a locked condition (e.g., corresponding to a parking gear, etc.) to an operational condition (e.g., out of park, corresponding to a drive gear and/or a neutral gear, etc.) and/or releasing the brakes (e.g., switching from an engaged configuration that limits movement of the response vehicle 100 to a disengaged configuration that does not limit movement of the response vehicle 100, etc.). For example, the interlock module 330 may lock the transmission and/or the brakes such that the response vehicle 100 may not be moved by an unauthorized user. To move the response vehicle 100 and/or deactivate the scene mode, the interlock module 330 may require a user to enter an access code (e.g., username, ID, password, on the display unit 340, on the user device 352, on the commander device 354, etc.) and/or perform a series of actions (e.g., activate and/or deactivate a series of switches and/or buttons, a fingerprint scan, a facial recognition scan, a retinal scan, etc.) to verify the user has permission to move the response vehicle 100. Once the user is verified, the interlock module 330 is configured to disengage the locks on the brakes and/or the transmission to allow the user to move the response vehicle 100.

According to an exemplary embodiment, activating the scene mode prevents the response vehicle 100 from rolling or otherwise moving in response to intentional and/or unintentional disengagement of the parking brake or other brakes without the user verifying permission and/or access to do so. For example, an accidental disengagement of the parking brake may allow the response vehicle 100 to unintentionally begin to roll (e.g., if parked on a slope, if the transmission is in neutral, etc.). However, the interlock module 330 keeps the brakes engaged and/or the transmission locked until the scene mode is deactivated (e.g., by a user entering an appropriate access code, performing a series of actions, etc.) to prevent such unintended movement of the response vehicle 100.

While vehicle management system 300 is described in FIG. 3 as a single system within a response vehicle, it should be understood that the various activities of vehicle management system 300 may be performed by various vehicle subsystems of the response vehicle. The arrangement and activities of the various modules of vehicle management system 300 may vary according to different embodiments. Further, the activities of the vehicle management system 300 may be performed by multiple vehicle management systems, particularly where multiple response vehicles are present at an incident site.

Figure 4:
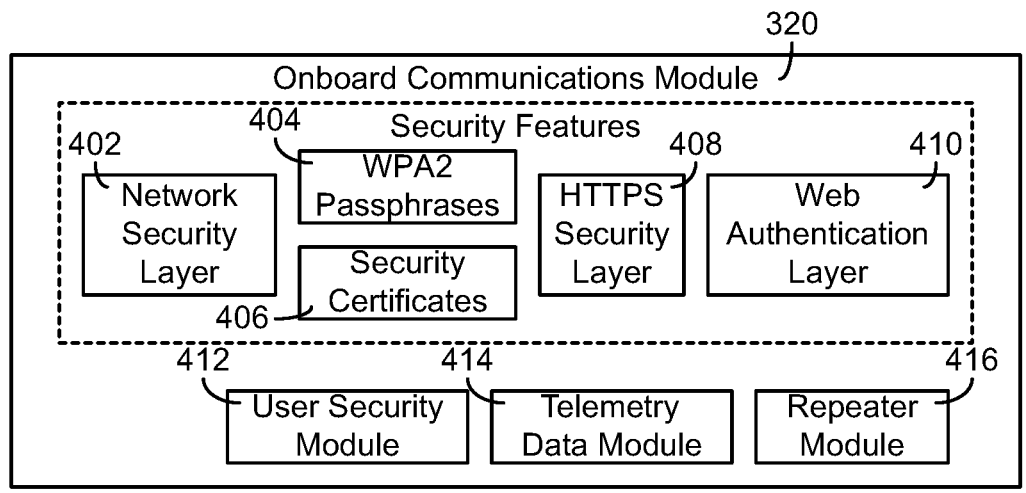
FIG. 4 is a detailed block diagram of the onboard communications module of the vehicle management system, according to an exemplary embodiment.

Referring now to FIG. 4, onboard communications module 320 is described in greater detail. In one embodiment, onboard communications module 320 includes a variety of security features to secure wireless communications with the other response vehicles and/or with the user devices. For example, onboard communications module 320 may include a network security layer 402 configured to prohibit unauthorized users and user devices from gaining access to the network being used by the response vehicles and associated user devices. Onboard communications module 320 may further support setting one or more WPA2 passphrases 404 to secure the network. A randomly generated SSID (service set identification) and long passphrase may be used to identify the network and secure the network from unauthorized users and user devices. Onboard communications module 320 may further support the use of security certificates 406 to verify the authenticity of a user device and/or other response vehicle device attempting to wirelessly communicate with the response vehicle.

Onboard communications module 320 may include a HTTPS security layer 408 configured to encrypt transmissions from the response vehicle using a local SSL certificate (e.g., to put the transmission under HTTPS instead of HTTP, etc.). Onboard communications module 320 may include a web authentication layer 410 configured to prevent unauthorized access. For example, even if a hacker or attacker accesses the communications from onboard communications module 320, he/she would still need a username and password (or other identification information) to read and/or change any data. Usernames, passwords, and other identification information may be provided via a separate interface from communications interface 302 and then used on the network supporting onboard communications module 320 communications. In one embodiment, a long term cookie may be set upon a successful authentication of a user device, which may be updated with timestamp information as the user continues to access the network shared with onboard communications module 320. Using the identification information, user devices may be given an appropriate permission level. For example, some user devices might have read-only access to data provided by the response vehicle, while other users may have read-write access (e.g., a commander, etc.). As another example, onboard communications module 320 may track who is currently in communication with the response vehicle, and may be configured to account for multiple people having read-write access (e.g., allowing only one user device at a time to have read-write access to the data, etc.). Different user interfaces (e.g., webpages, etc.) may be provided based on an access level of the user.

As shown in FIG. 4, onboard communications module 320 includes a user security module 412. User security module 412 may generally define a plurality of groups that allow and/or restrict functionality and access to the data provided by the response vehicle and/or control of the response vehicle. User security module 412 may define a plurality of groups including, by way of example only: technician, administrator, responder (e.g., firefighter, policeman, etc.), etc. A technician may be able to troubleshoot system level issues and provide diagnostics, repairs, and maintenance of the network and communications between the user devices and response vehicles. For example, the technician may be able to check for device and software updates (and to push the updates to the user devices) and may be provided with the highest level of security in accessing the network (having unrestricted access). A technician may further have the capability to configure the presentation of information on user devices (e.g., customizing a logo or name, etc.).

An administrator may be able to configure and provision field device access. For example, when responding to an incident, the administrator may manage which devices have access to which information. In other words, those in the administrator group may be able to act as a commander at an incident. Administrators may generally be able to add, modify, and/or delete device level user accounts, view reports of telemetry data and other data, control one or more features of the response vehicle, and update device software and apply firmware patches manually as needed.

A responder (e.g., a policeman, a firefighter, etc.) may be a user in the field responding to an incident. The responder group may be created for users who have access to the network via a pre-authenticated device and/or user account. The responder may have to enter (or have previously entered) credentials specific to the user account to access the network. The responder may be able to view telemetry data and manually control various onboard systems of the response vehicle (e.g., a subset of features of the response vehicle, etc.).

Onboard communications module 320 may include a telemetry data module 414 configured to analyze telemetry data relating to the transmissions over a network between response vehicles and user devices. Telemetry data may generally refer to metrics relating to the transmission of signals to and from the response vehicle. The response vehicle 100 may include any number of sensors 344 configured to record telemetry data for use by onboard communications module 320. The telemetry data may be used to analyze the network performance of a Wi-Fi network local to the response vehicle on site at an incident. The telemetry data may be used to determine which devices and vehicles are capable of communicating with one another and facilitating connections to allow the devices and vehicles to communicate with one another.

Onboard communications module 320 may include a repeater module 416. Repeater module 416 may facilitate the operation of onboard communications module 320 as a repeater at the scene of an incident. Referring again to FIG. 2, one response vehicle 204 may be within wireless range of a commander 202 device, but another response vehicle 208 may not be. The commander may generally be responsible for managing all personnel and equipment at the incident site, and the personnel and equipment may be from different stations, thus making it challenging for the commander to manage. It may be determined, by telemetry data module 414, that the commander is out of range of at least some of the user devices and/or response vehicles.

In some embodiments, the communications module of response vehicle 204 includes or acts as a repeater (e.g., thereby allowing commander 202 to communicate with the out-of-range response vehicles, etc.). Commander 202 may thereby view the status of, command, and/or otherwise communicate with each of the response vehicles at the site. For example, the commander may be provided with data relating to the status of every response vehicle (e.g., to see if any response vehicle has a fault, is breaking down, is running low on fuel, etc.). Since the range of Wi-Fi communications may be limited at the incident site (e.g., 300 feet, etc.), the use of the communications module as a repeater to transmit signals at a stronger power level allows the commander to communicate back and forth with all personnel and/or equipment at the incident site.

A signal received at response vehicle 204 that is targeted for response vehicle 206 or 208 may be retransmitted by response vehicle 204 at a higher power level (e.g., relative to the signal as received, etc.), so that the signal can reach the appropriate destination. In one embodiment, repeater module 416 may receive the signal from a mobile device of commander 202 and determine if a retransmission of the signal is necessary for the signal to reach its destination. Repeater module 416 may include logic for determining the position of the various response vehicles on site at the incident (e.g., to determine if a signal reached a destination, to receive feedback from other response vehicles, etc.) and determine an appropriate transmission power.

Repeater module 416 may additionally receive transmissions from other response vehicles that are not powerful enough to reach the commander 202 device. Repeater module 416 may retransmit the signal so that the signal is strong enough to reach commander 202. In some embodiments, onboard communications module 320 is configured to facilitate communications with user devices via one or more portable repeaters 214.

Figure 5:
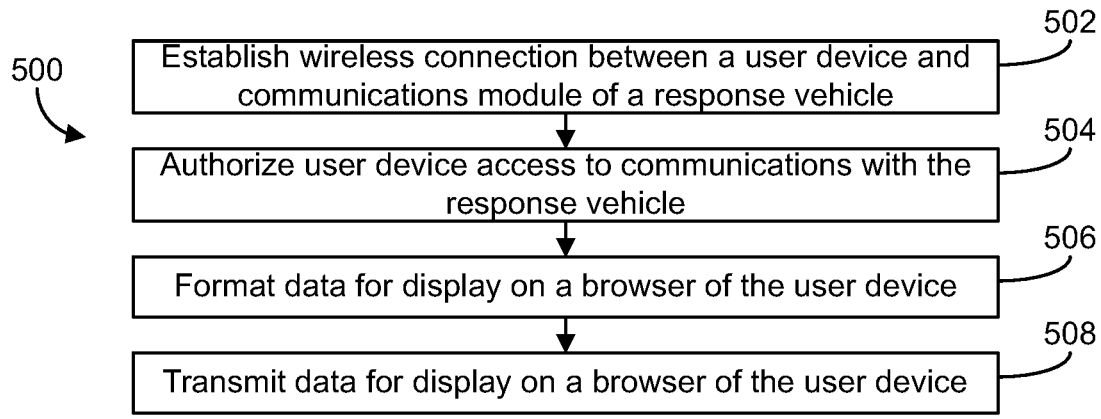
FIG. 5 is a flow chart of a process for enabling wireless communications between a response vehicle and a user device, according to an exemplary embodiment.

Referring now to FIG. 5, a flow chart of a process 500 for enabling wireless communications between a response vehicle and a user device is shown, according to an exemplary embodiment. Process 500 may be executed by, for example, onboard communications module 320.

Process 500 includes establishing a wireless connection between a user device and a communications module of a response vehicle (block 502). Block 502 may include a user device initializing the connection (e.g., the user device sending a signal picked up by the communications module, etc.) or the communications module initializing the connection (e.g., upon arriving at an incident, the communications module, or the user device, may automatically set up the connection as the user is leaving the response vehicle, etc.).

Process 500 further includes authorizing user device access to communications with the response vehicle (block 504). Block 504 may include the user providing his or her credentials (e.g., login, password, etc.) or the user device automatically transmitting its credentials to the response vehicle, and the communications module verifying the user device.

In one embodiment, telemetry data, diagnostics data, or other data may be transmitted to the user device. The transmission may be based on a scheduled or automatic transmission of the data or a user request of the data. Process 500 may include formatting the data for display on the user device (block 506). For example, the data may be displayed on a browser of the user device instead of being displayed via an application. Process 500 further includes transmitting the data for display on the browser of the user device (block 508). The data may include telemetry data, diagnostics data, or any other data relating to the operation of the response vehicle or to the incident.

Figure 6:
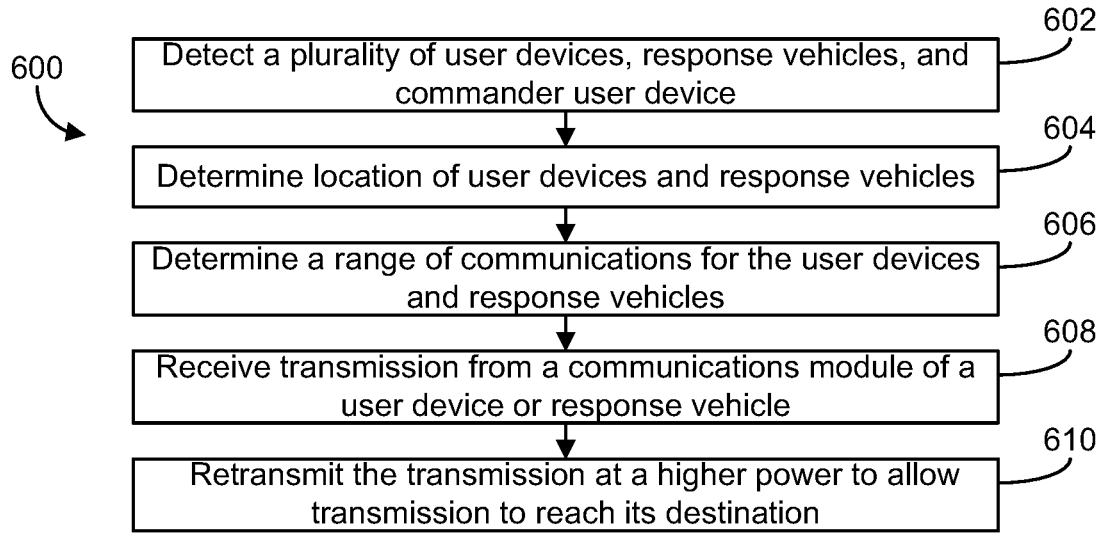
FIG. 6 is a flow chart of a process for enabling wireless communications between a plurality of response vehicles and user devices, according to an exemplary embodiment.

Referring now to FIG. 6, a flow chart of a process 600 for enabling wireless communications between a plurality of response vehicles and/or user devices is shown, according to an exemplary embodiment. Process 600 may be executed by, for example, onboard communications module 320. Process 600 may be executed to allow a communications module of a response vehicle to function as a repeater.

Process 600 includes detecting devices, which may include a plurality of user devices, response vehicles, and/or a commander user device (block 602). For example, a number of response vehicles (and personnel) may arrive at an incident, and block 602 may include determining the presence of the various response vehicles and/or user devices. Process 600 further includes determining the location of the various user devices and/or response vehicles (block 604), and determining a range of communications for the user devices and/or response vehicles (block 606). Blocks 604 and 606 may be executed to determine which communications modules are capable of reliably communicating with one another. Since the location of the various personnel and vehicles on site may vary, and Wi-Fi transmissions may be limited, some user devices including a commander user device may not be in range of all response vehicles. Block 606 may include receiving telemetry data from a plurality of sensors (e.g., sensors 344, etc.) and devices, and using the telemetry data to analyze the communications capabilities at the incident site.

Process 600 further includes receiving a transmission from a communications module (block 608). The transmission may originate from a user device and/or response vehicle, and may be intended for a communications module not in range of the original communications module. For example, the transmission may be from a commander user device for a response vehicle outside of wireless range. As another example, the transmission may be from a communications module of a response vehicle, including telemetry data, diagnostics data, and/or other data. Process 600 further includes retransmitting the transmission at a higher power than received (block 610), allowing the transmission to reach its destination.

Figure 7:
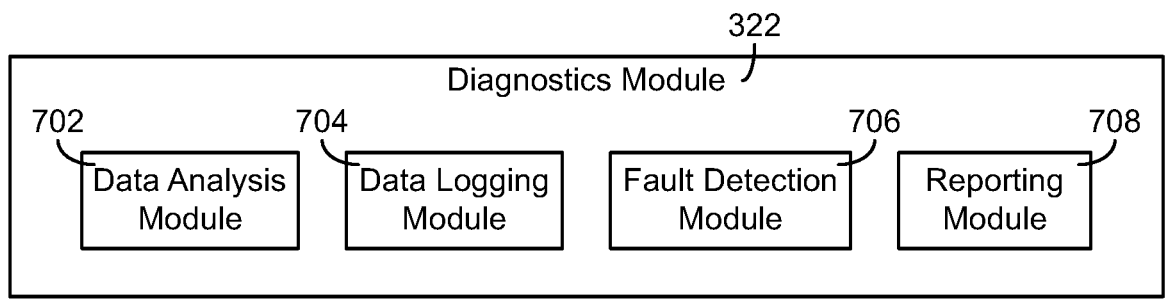
FIG. 7 is a detailed block diagram of a diagnostics module of the vehicle management system, according to an exemplary embodiment.

Referring now to FIG. 7, diagnostics module 322 of vehicle management system 300 is described in greater detail. Diagnostics module 322 may receive data relating to the operation and/or condition of the response vehicle, determine diagnostic information using the data, and provide the diagnostic information to a display of the response vehicle and/or a user device. While diagnostics module 322 is shown as a standalone module in FIG. 7, in other embodiments, the various activities described in diagnostics module 322 may be carried out by other modules and systems of the vehicle management system 300 of the response vehicle 100. Further, while diagnostics module 322 is shown to manage all kinds of data and information relating to the response vehicle 100, some of the data or information may be managed by other modules.

Diagnostics module 322 may be configured to receive any type of data. As shown in FIG. 7, diagnostics module 322 includes a data analysis module 702 configured to receive response vehicle data. Response vehicle data may generally relate to the various vehicle subsystems 342. For example, the data may include data about the vehicle systems 342 that may be common among various types of vehicles, such as the engine, transmission, brakes, lights, ignition, fluid levels, fuel system, a generator, etc. The data may further include data that relates more specifically to special features of the response vehicle 100. For example, the data may relate to the status of various equipment. If the response vehicle 100 is the fire truck, the data may include data relating to the use of the hoses, the sirens and warning lights, ladder, foam system, water pumps, and other fire-related equipment. A data logging module 704 may be configured to log response vehicle data. The data may be stored locally on a module of the response vehicle 100 and/or may be transmitted to the remote server 356 for long-term storage.

A fault detection module 706 is configured to use data from data analysis module 702 and logged data from data logging module 704 to determine if a fault exists in the response vehicle 100. In one embodiment, faults may relate to general vehicle performance (e.g., low fluid levels, faulty brakes, etc.). In another embodiment, faults may relate more specifically to the performance of response vehicle equipment. The response vehicle 100 may include a plurality of sensors (e.g., sensors 344, etc.) used to detect faults. For example, the vehicle may include an accelerometer to measure acceleration, deceleration, an accident or rollover condition, or other condition of the response vehicle 100.

In one embodiment, the faults defined by fault detection module 706 are detailed. For example, instead of providing a "check engine" alert to a user, fault detection module 706 may indicate a particular faulty engine component, to allow a user to diagnose the fault on site and to potentially address the fault without needing a mechanic, additional diagnostic charts or equipment, or other assistance. The faults may be displayed as warnings or alerts on the display unit 340 of the response vehicle 100 and/or a user device (e.g., display module 326, etc.). The display may generally include visuals and texts illustrating the fault and may include potential repairs for the fault (e.g., a picture of the faulty equipment, step-by-step directions to fix the fault or otherwise address the fault, etc.). Such a system offers significant advantages relative to traditional warning lights displayed upon detection of a fault (e.g., the "check engine" light, etc.).

A reporting module 708 may be provided to generate a report relating to one or more faults of the response vehicle 100. For example, reporting module 708 may format the fault data for display on a webpage on a browser of a user device. Onboard communications module 320 may then transmit the fault data wirelessly (as described above) to the user devices. In one embodiment, reporting module 708 may be configured to report fault data to a commander user device.

In some embodiments, reporting module 708 is configured to generate reports relating to response vehicle health and performance. For example, the report may include the status of equipment of the response vehicle 100 (e.g., a fuel level, if any equipment needs replacing or attending to, etc.). The report may be formatted for display on a webpage of a browser of a commander user device.

Figure 8:
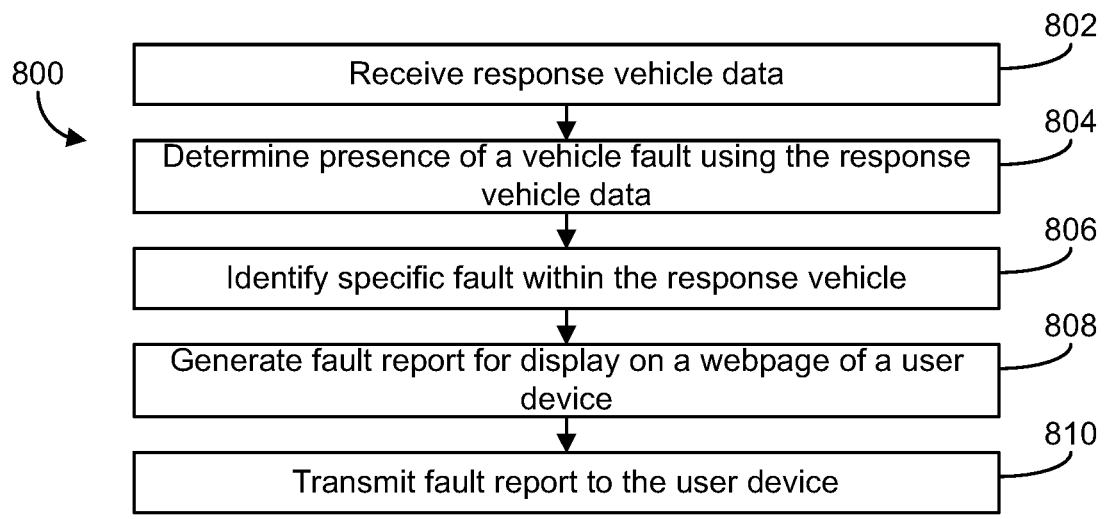
FIG. 8 is a flow chart of a process for providing diagnostic information relating to the response vehicle, according to an exemplary embodiment.

Referring now to FIG. 8, a flow chart of a process 800 for providing diagnostic information to a user is shown, according to an exemplary embodiment. Process 800 may be executed by, for example, diagnostics module 322. Process 800 may be executed to provide diagnostic information to a commander on site at an incident or to a technician remote from the vehicle. For example, the commander may receive diagnostic information from all response vehicles on site at an incident, and may manage the use of (e.g., control, etc.) the response vehicles, personnel, and equipment at the incident.

Process 800 includes receiving response vehicle data (block 802) and determining the presence of a vehicle fault using the response vehicle data (block 804). For example, the response vehicle data may relate to general vehicle functionality or to the status of various vehicle-related equipment. The response vehicle data may be checked to determine if any vehicle system is not performing properly, and block 804 includes determining a fault when a particular vehicle system is not performing properly.

Process 800 includes identifying a specific fault within the response vehicle (block 806). For example, instead of just identifying a fault with a particular vehicle system, the particular part or component associated with the fault may be identified by the diagnostics module. A fault report is generated for display on a webpage on a user device and/or display unit of the response vehicle (block 808). For example, the report may generally include fault information, as well as more specific details on the location of the fault and how to address the fault, among other details. Process 800 includes transmitting the fault report to the user device and/or display unit (block 810), such as a commander user device of a commander in charge of managing the response vehicle and/or a remote service technician.

Figure 9:
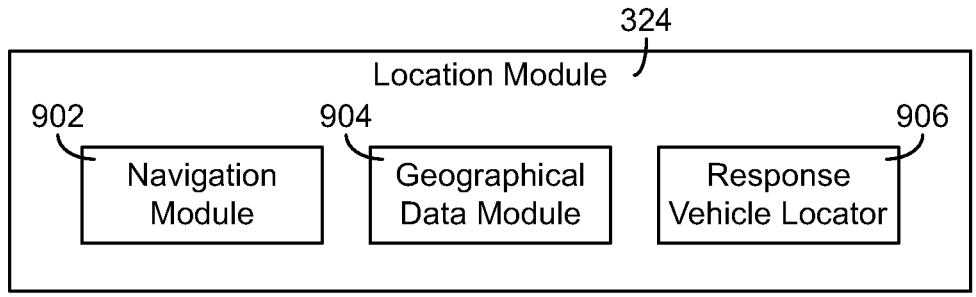
FIG. 9 is a detailed block diagram of a location module of the vehicle management system, according to an exemplary embodiment.

Referring now to FIG. 9, location module 324 of vehicle management system 300 is described in greater detail. Location module 324 may generally be a navigation and/or mapping application configured to provide a display of a response vehicle and/or a user device with navigation and location information to aid in response to an incident. In one embodiment, location module 324 is a standalone module and may communicate with a remote server (e.g., a remote GPS server). In other embodiments, the location module may be integrated with any other vehicle system, may be integrated with a GPS or other general navigation system, or otherwise integrated.

In one embodiment, the activities of location module 324 are integrated with the other modules of vehicle management system 300. Location module 324 may communicate (via a wired or wireless connection) with onboard communications module 320 and diagnostics module 322 to support the activities of the modules. For example, if diagnostics module 322 identifies a fault or alert, location module 324 may be configured to generate location information for the response vehicle 100 with the fault to facilitate providing coordinated data to a commander user device.

As shown in FIG. 9, location module 324 includes a navigation module 902. Navigation module 902 may generally be configured to provide general navigation assistance to the response vehicle 100. For example, navigation module 902 may receive a destination (e.g., the site of an incident, etc.), and may generate turn-by-turn directions for the response vehicle 100 to the destination. Navigation module 902 may further provide routing assistance (e.g., choosing a best or quickest route, identifying obstacles, etc.) to a driver of the response vehicle 100. The destination may be received from a remote source, or may be manually entered by an occupant of the response vehicle 100 (e.g., when there is no incident and the navigation process is not automatically started by location module 324, etc.). Navigation module 902 may be configured to provide navigation features on the display unit 340 of the response vehicle 100 (or user device) even when location module 324 (and/or vehicle management system 300) does not have a wireless connection with a remote server.

As shown in FIG. 9, location module 324 includes a geographical data module 904 configured to identify geographical points of interest for the response vehicles and personnel. For example, if the response vehicle 100 is a fire truck, hydrant and water point locations may be of interest to the response vehicle 100 and personnel. As another example, geographical data module 904 may identify tactical waypoints when responding to an incident. If the incident is a fire, for example, such waypoints may include a safe zone or area, a potential building or other location under increased risk, potential hazards that may make responding to the incident difficult, etc. Geographical data module 904 may retrieve all such data and use the data to help determine the best course of action for the response vehicle 100 and personnel. For example, the data may be used to determine how the personnel should or could approach the incident when arriving at the incident site. Geographical data module 904 may retrieve pre-stored information relating to geographical points of interest, and/or retrieve the geographical points of interest from a remote server.

In one embodiment, location module 324 includes a response vehicle locator 906 configured to locate other response vehicles responding to an incident. Response vehicle locator 906 may detect the presence of a response vehicle or may receive a transmission from a remote server indicating the future presence of other response vehicles at an incident site. Upon arriving at the incident, the determination that other response vehicles are at the incident may be used by response vehicle locator 906 to determine wireless communication capabilities between the response vehicles and user devices at the incident, as described above.

Figure 10:
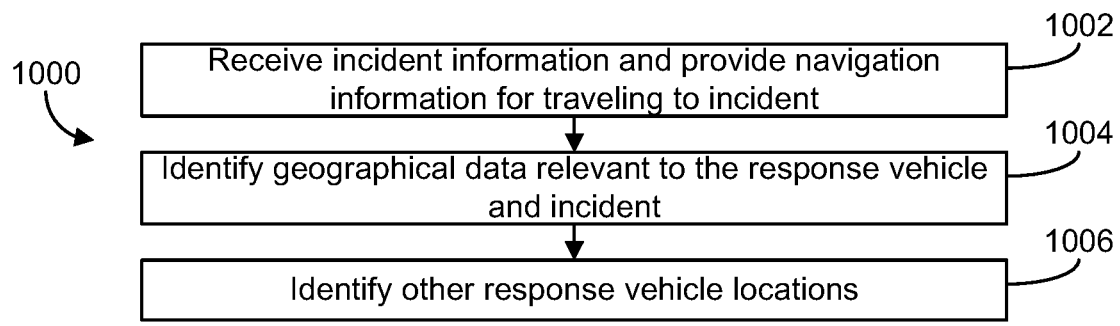
FIG. 10 is a flow chart of a process for providing location information to a user of the response vehicle, according to an exemplary embodiment.

Referring now to FIG. 10, a flow chart of a process 1000 for providing location information to a user of the response vehicle is shown, according to an exemplary embodiment. Process 1000 may be executed by, for example, location module 324. The location information may be provided to the user via a display of the response vehicle or a user device.

Process 1000 includes receiving incident information and providing navigation information for traveling to the incident (block 1002). Process 1000 further includes identifying geographical data relevant to the response vehicle and incident (block 1004). Upon identifying the incident at block 1002, the location module 324 may determine information that may be helpful to personnel. For example, if the incident is a fire, block 1004 may include identifying the location of hydrants or other water points near the fire. Block 1004 may further include identifying any potential hazards, risks, or zones at the incident (e.g., identifying a particular safe zone, a zone with high risk, identifying conditions that may make responding to the incident difficult, etc.). In some embodiments, block 1004 includes identifying tactical waypoints that can be used by response vehicles and personnel to more advantageously respond to the incident.

Process 1000 further includes identifying other response vehicle locations (block 1006). The other response vehicle locations may be used by other systems of the vehicle management system (e.g., onboard communications modules, etc.) to facilitate wireless communications with the other response vehicles.

Figure 11:
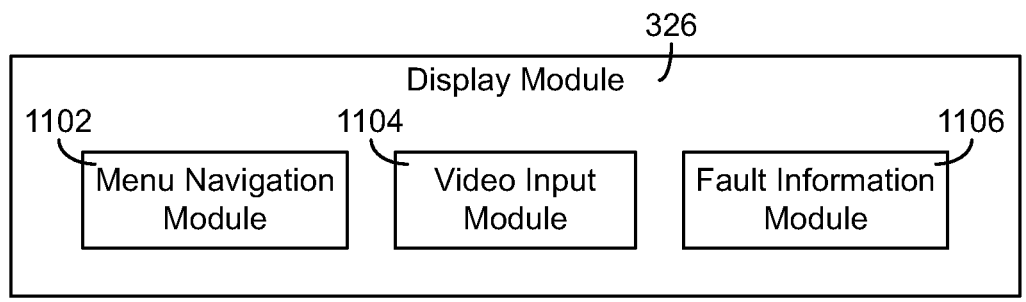
FIG. 11 is a detailed block diagram of a display module of the vehicle management system, according to an exemplary embodiment.

Referring now to FIG. 11, display module 326 of vehicle management system 300 is described in greater detail. Display module 326 may generally be configured to generate an interface for display on a touchscreen display of the response vehicle 100. For example, the interface may allow users to provide commands via touch input, may display diagnostic information generated by diagnostics module 322 or location information from location module 324, or may otherwise receive and provide information.

While display module 326 is described as providing an interface for display on a user interface of the response vehicle 100, display module 326 may further provide the interface for display as a webpage on a user device. For example, as described above, a user or commander may access a webpage on a browser of a user device that allows the user or commander to view response vehicle information. In one embodiment, a commander may view the health or status of response vehicles on his or her user device. While display module 326 is described with reference to the response vehicle in FIG. 11, it should be understood that display module 326 may provide the same or a similar type of interface, with the same, similar, or different types of features (e.g., touchscreen input capability, etc.) to the user devices as well.

The touchscreen display of the response vehicle 100 may include any number of supporting buttons and other tactile user inputs to support interaction between a user and the display. For example, a plurality of push buttons may be located next to or below the display to provide the user with further options. It should be understood that the configuration of the touchscreen display in the response vehicle 100 may vary without departing from the scope of the present disclosure.

The display of the response vehicle 100 may include or support various technologies. For example, the display may be a touchscreen display and may be separated into any number of portions (e.g., a split-screen type display, etc.). For example, a first portion of the screen may be reserved for one particular type of display (e.g., warnings and alerts, etc.), while another portion of the screen may be reserved for general vehicle information (e.g., speed, fuel level, etc.). The display may be configured to handle any type of transition, animation, or other display feature that allows for ease of access of information on the display.

In one embodiment, the display is coupled to a USB input, allowing the display software to be updated. For example, such updates may include updating the maps stored on the display (e.g., to improve navigation features, etc.). Further, custom files may be downloaded to the display (e.g., custom logos, images, text, etc.) to personalize the display for use in the response vehicle 100.

The display may include any number of video inputs (e.g., from one or more cameras located on the response vehicle 100, etc.). For example, the display may be capable of receiving four video inputs and may display up to four video inputs simultaneously on the display. The display may be configured to detect when a camera feed is up, therefore determining when to display a video input on the display or not (e.g., not displaying a blank or blue screen, etc.).

As shown in FIG. 11, display module 326 includes a menu navigation module 1102 configured to manage navigation of the menus and options provided on the display. For example, a user may navigate through the various display options presented by display module 326 via a menu. The display may include any number of touchable widgets. Upon touch of a widget on the touchscreen, the user may be taken to the appropriate screen. Widgets may relate to particular features, such as navigation, a diagnostics report, a home screen (e.g., main screen of the display, etc.), and a back/exit button for ease of navigating the display. Menu navigation module 1102 may manage the menu options presented to the user at a particular screen, allowing the user to scroll through information, select information, to retreat to a previous screen or screens, etc.

As shown in FIG. 11, display module 326 includes a video input module 1104 configured to manage the display of video input on the display. As described above, the display may be configured to display one or more video inputs. Video input module 1104 may receive the video inputs and format the inputs for display. Formatting the inputs for display may include adjusting a brightness or contrast level of the video, highlighting or identifying a point of interest in the video for the user, sizing the video input for playback on the display, etc. For example, the display may be configured to support a screen resolution anywhere from, e.g., 240×240 to 1024×768, depending on how many video inputs are shown at once. In one embodiment, video input module 1104 detects when a video input is not available for display rather than provide a blank video input for display. In some embodiments, a user can navigate away from the display of the video inputs; in other embodiments, depending on the incident and the situation, a video input may be locked onto the screen or automatically provided, with or without user request.

In one embodiment, a command to display the video input may be received from, for example, diagnostics module 322 or another module. Display module 326 includes a fault information module 1106 configured to manage the display of fault information on the screen. For example, diagnostics module 322 may detect a scenario in which the response vehicle should not move (e.g., equipment attached to the vehicle is deployed, doors are open, etc.). Fault information module 1106 may be configured to generate a display with the "do not move truck" command displayed on the screen, along with a diagram or other text or image accompanying the command. As another example, a seat belt fault may be generated for display on the screen by fault information module 1106 if diagnostics module 322 detects that a seat belt is not being worn by an occupant. As another example, if diagnostics module 322 generates a tire pressure warning, fault information module 1106 may generate a display, which may include identifying the tire with low pressure along with the pressure level of all the tires of the response vehicle. In various embodiments, the activities of fault information module 1106 and diagnostics module 322 may be shared.

Referring now to FIGS. 12-27, exemplary user interfaces 1108 that may be generated by display module 326 are shown. Referring generally to the user interfaces, the user interfaces include a plurality of touchable widgets on the bottom of the screen. While the touchable widgets are shown on the bottom of the screen, in other embodiments, the touchable widgets are otherwise disposed on the user interface 1108. As described above, the user may touch a widget to be taken to a home screen, a general navigation or diagnostics screen, or other general screen that provides response vehicle information to the user.

Figure 12:
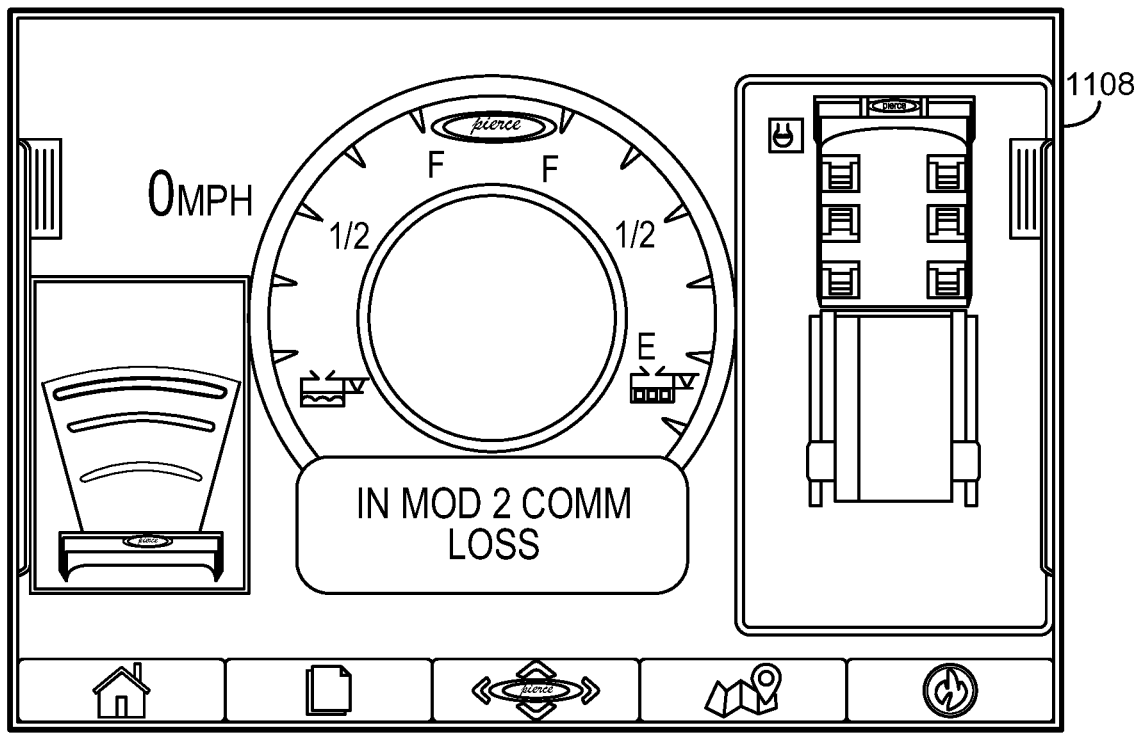
FIGS. 12-27 are example user interfaces that may be provided on a display of the response vehicle or a user device, according to various exemplary embodiments.

Referring to FIG. 12, a user interface 1108 is shown that may be presented during response vehicle transit. The user interface 1108 of FIG. 12 may include general vehicle information, such as the speed of the vehicle, fuel/oil levels, an occupant status, and/or the status of sirens and warning lights of the response vehicle. The user interface 1108 of FIG. 12 may be presented while the response vehicle is being driven to an incident site and there are no warnings or faults that need to be displayed.

Figure 13:
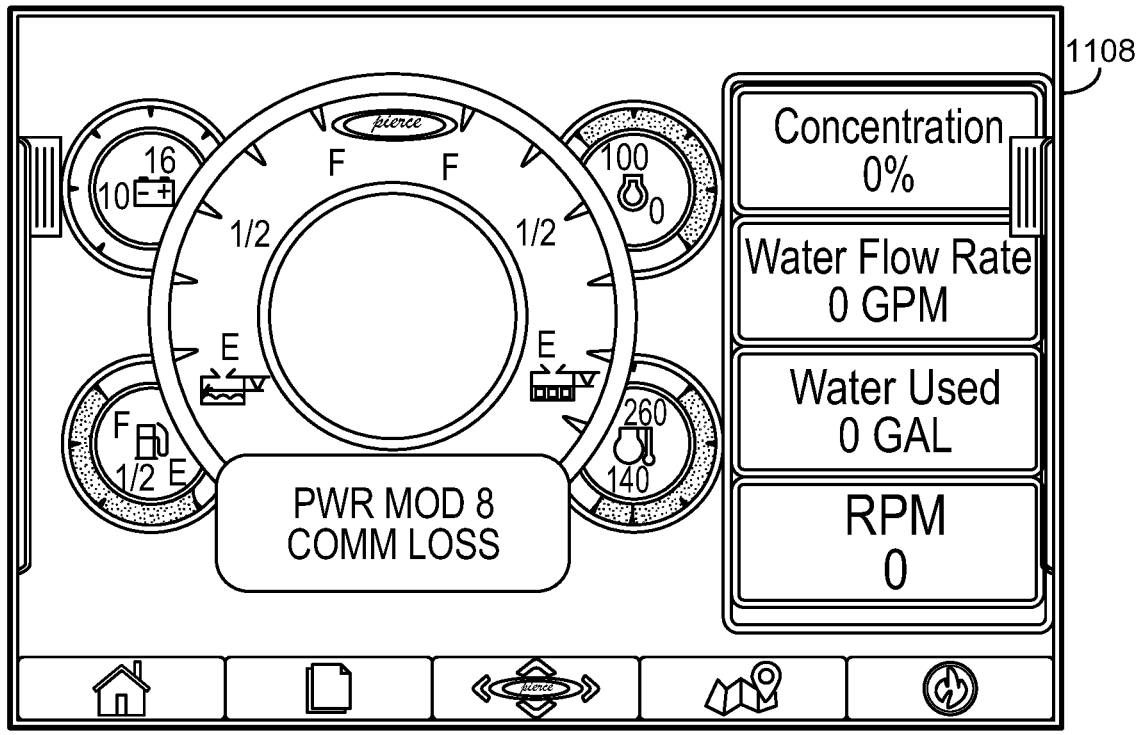

When the response vehicle arrives at an incident, the user interface 1108 of FIG. 13 may be presented. Display module 326 may present a general "scene mode" screen when the response vehicle is on site and there are no faults or other conditions that need to be displayed. The user interface 1108 may include the fuel/oil level of the vehicle, battery status, and other general vehicle information. The user interface may further display, for example, a water flow rate, the amount of water and/or foam used, and other such information. For example, if the response vehicle is a fire truck, water consumption may be tracked by diagnostics module 322 and presented for display on the user interface.

Figure 14:
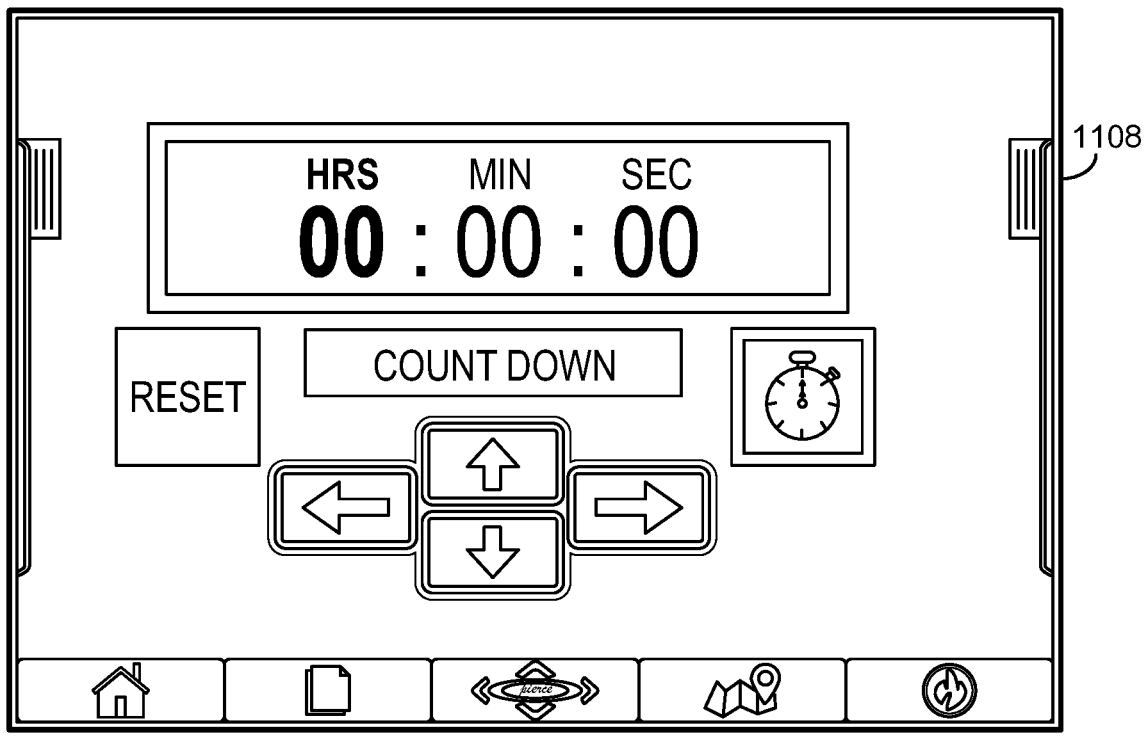

Referring to FIG. 14, a timer screen 1108 is illustrated. The timer screen 1108 may be operable by an occupant of the response vehicle and may be used to track time in time-sensitive situations. For example, the timer may indicate the expected duration of a trip to an incident. As another example, the timer may be used to track any time-sensitive operation of a user (e.g., how much time has elapsed since a fire fighter entered a building or since a certain incident or action, etc.).

Figure 15:
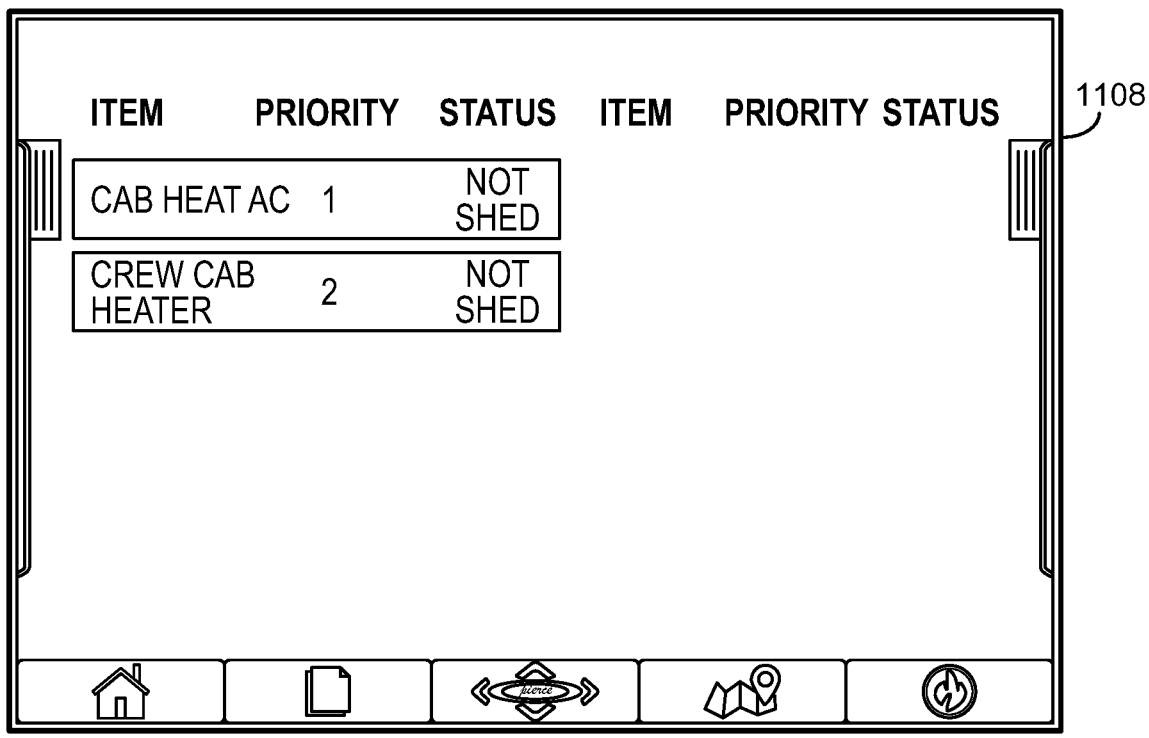

Referring to FIG. 15, a load manager screen 1108 is illustrated. Upon a user selecting a diagnostics option on the touchscreen, the user may select or view various diagnostics information. In the user interface 1108 of FIG. 15, the user may view vehicle subsystems currently operating in the vehicle. For example, an HVAC unit may be operating to provide heat and/or air conditioning in a cabin of the response vehicle. The various vehicle subsystems may be ranked in importance, or designated a high or low importance, by diagnostics module 322. Using the user interface 1108 of FIG. 15, a user may change or disable the operation of any vehicle subsystem that may be using too many resources of the response vehicle.

Figure 16:
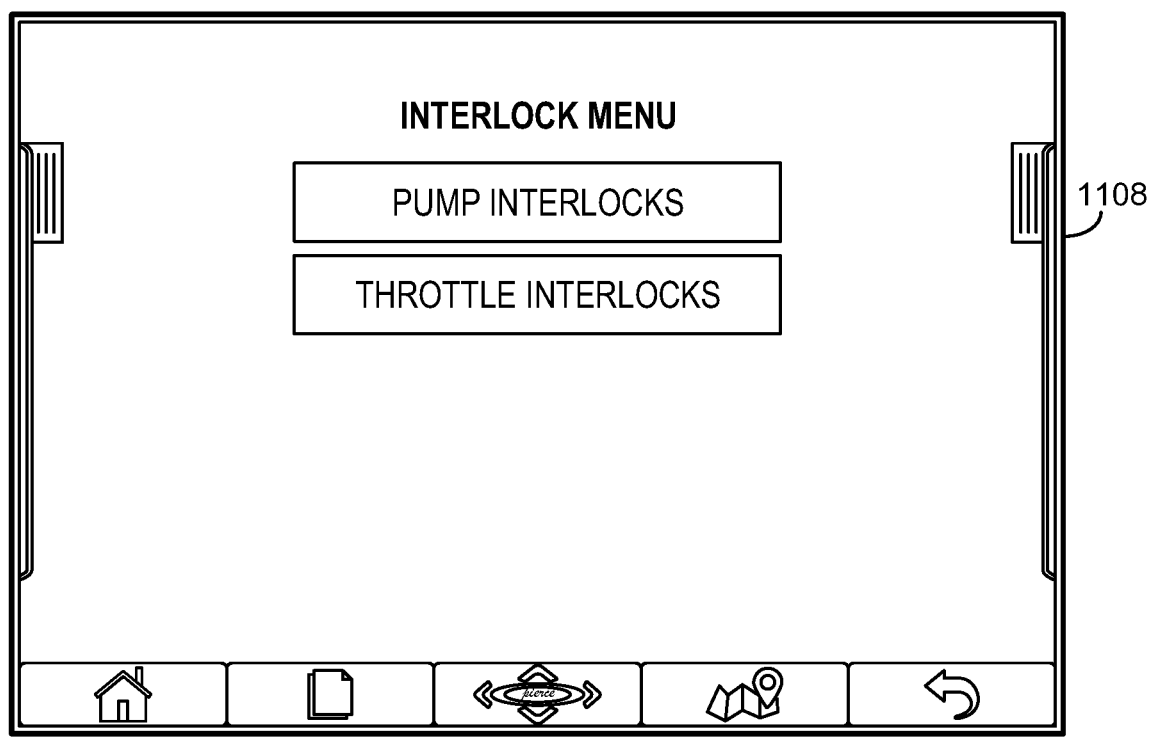
Figure 17:
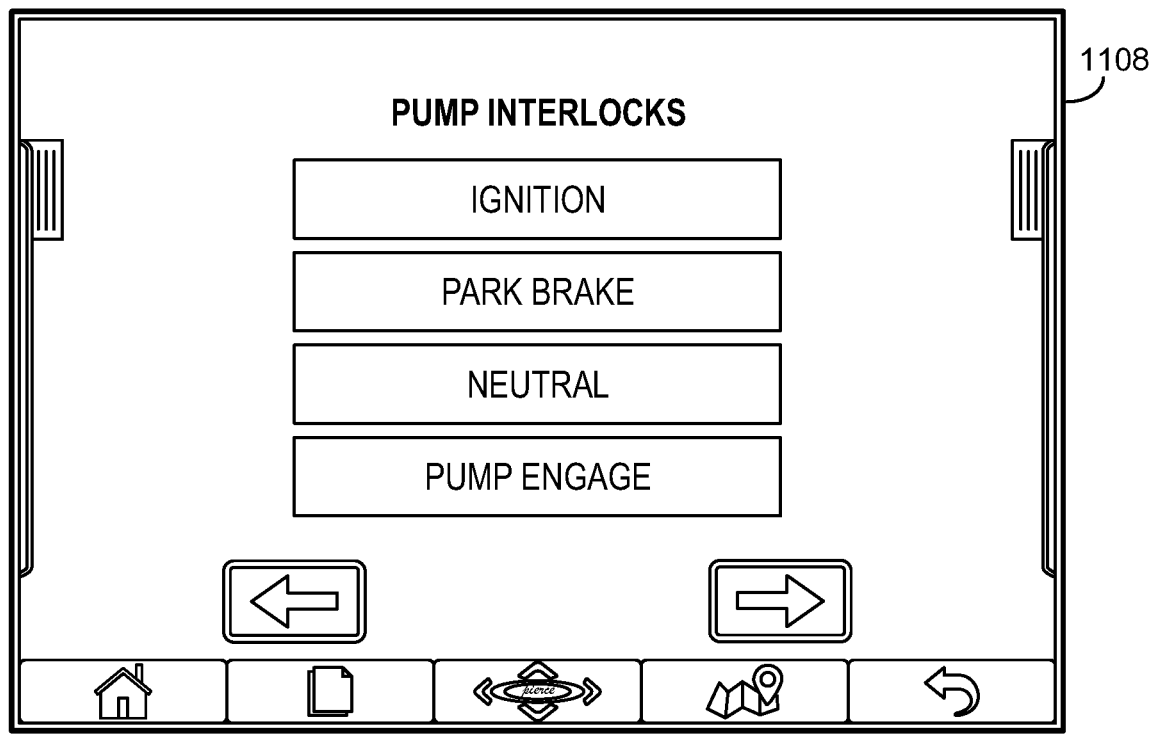
Figure 18:
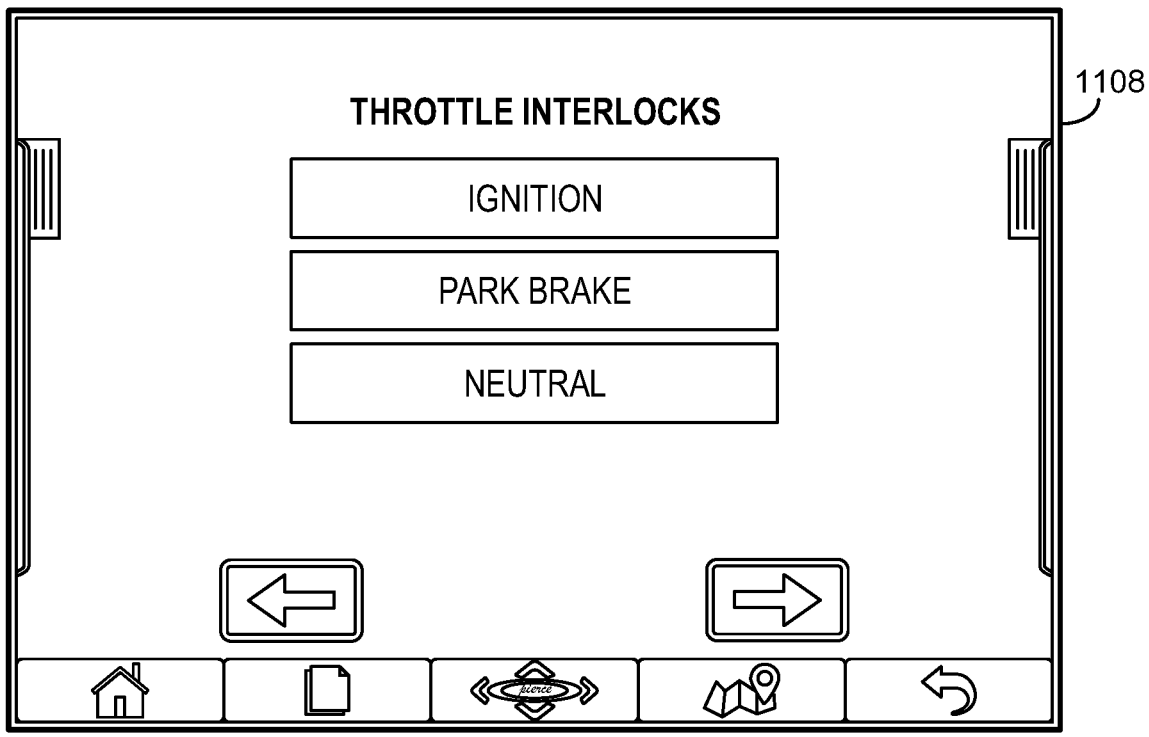

Referring to FIG. 16, one option under diagnostics may be to view the status of interlocks in the vehicle. For example, in FIG. 16, the user may view the status of the pump interlocks or throttle interlocks in the response vehicle. Upon selection of the pump interlock option, the user may be presented with the user interface 1108 of FIG. 17. Upon selection of the throttle interlock option, the user may be presented with the user interface 1108 of FIG. 18. From the resulting user interface 1108, the user may select a specific interlock for a specific vehicle component, to change system settings or view further diagnostic information.

Figure 19:
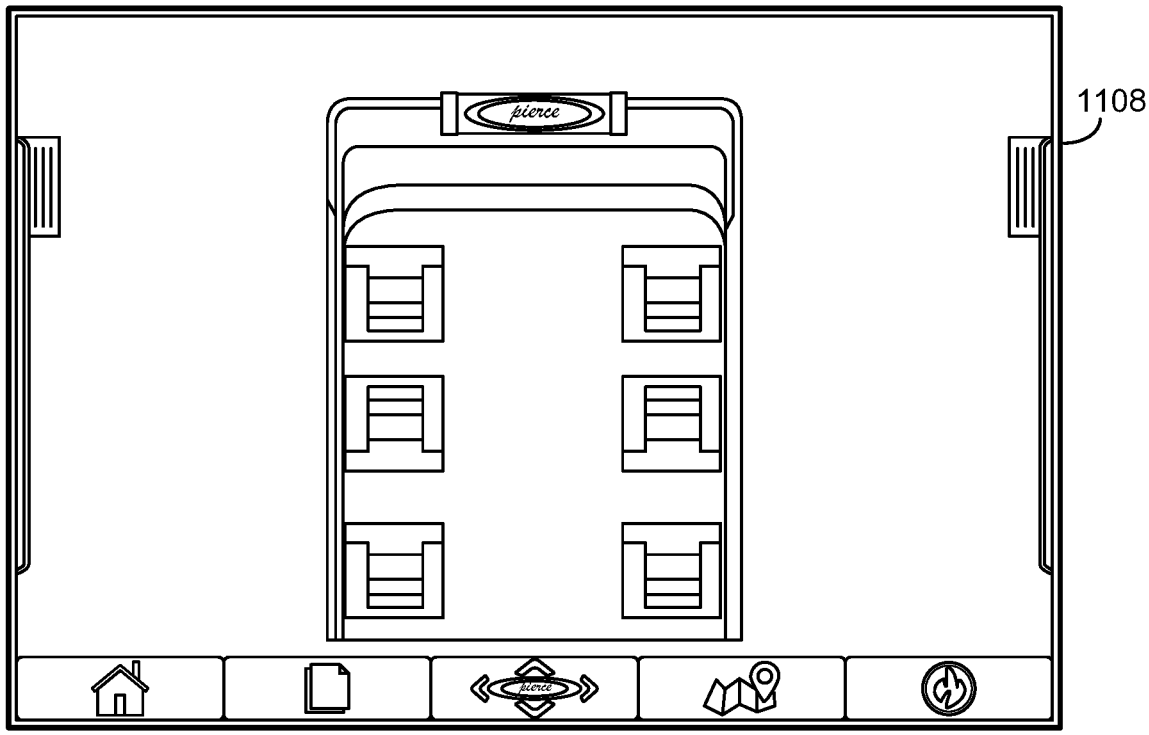

Referring now to FIG. 19, a seat belt monitor user interface 1108 is shown. Upon diagnostics module 322 detecting a user not wearing a seat belt, an indication may be presented on the user interface 1108 of FIG. 19. In one embodiment, the seat belt monitor display may be presented on the entire display (e.g., when a seat belt is not being worn, etc.), or may just take a portion of the display (e.g., when all seat belts are being worn, etc.).

Figure 20:
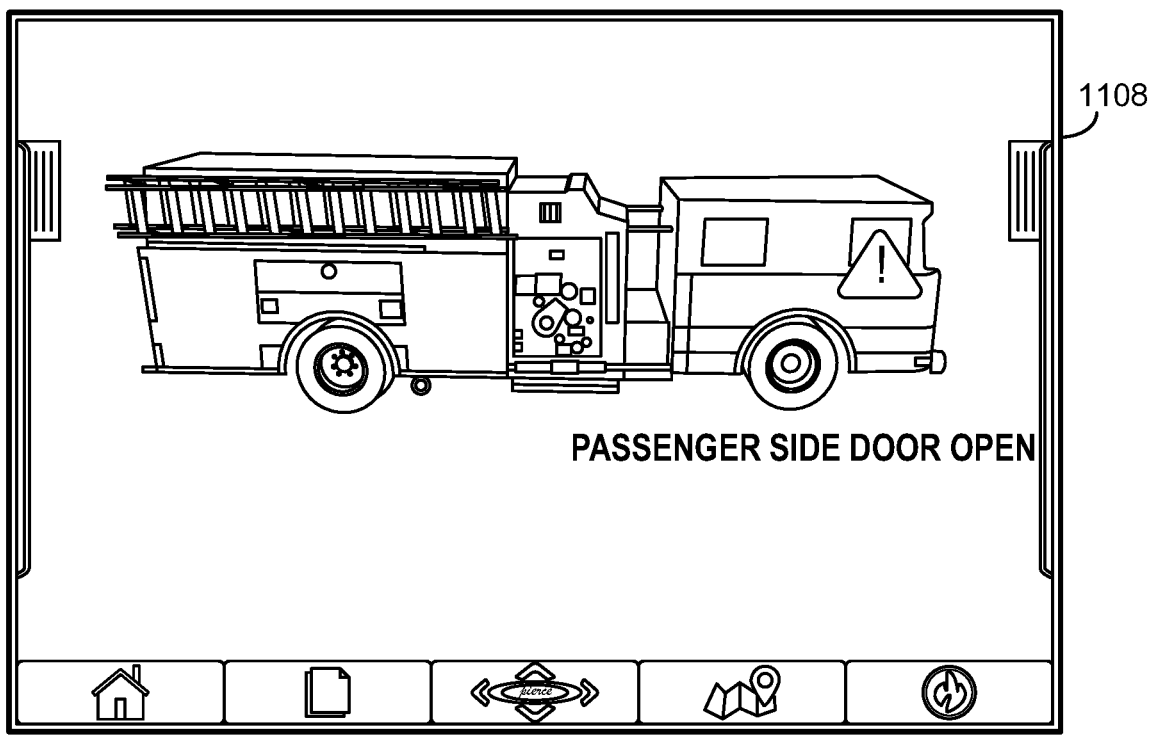

Referring now to FIG. 20, when diagnostics module 322 detects an open passenger door, a user interface 1108 may be presented that informs the user that the door is open, and that the response vehicle should not be operated. The user interface may include any type of image or other textual or visual warning of the condition triggering the "do not move truck" condition. For example, an exclamation point and icon is shown on top of the passenger door in FIG. 20.

Figure 21:
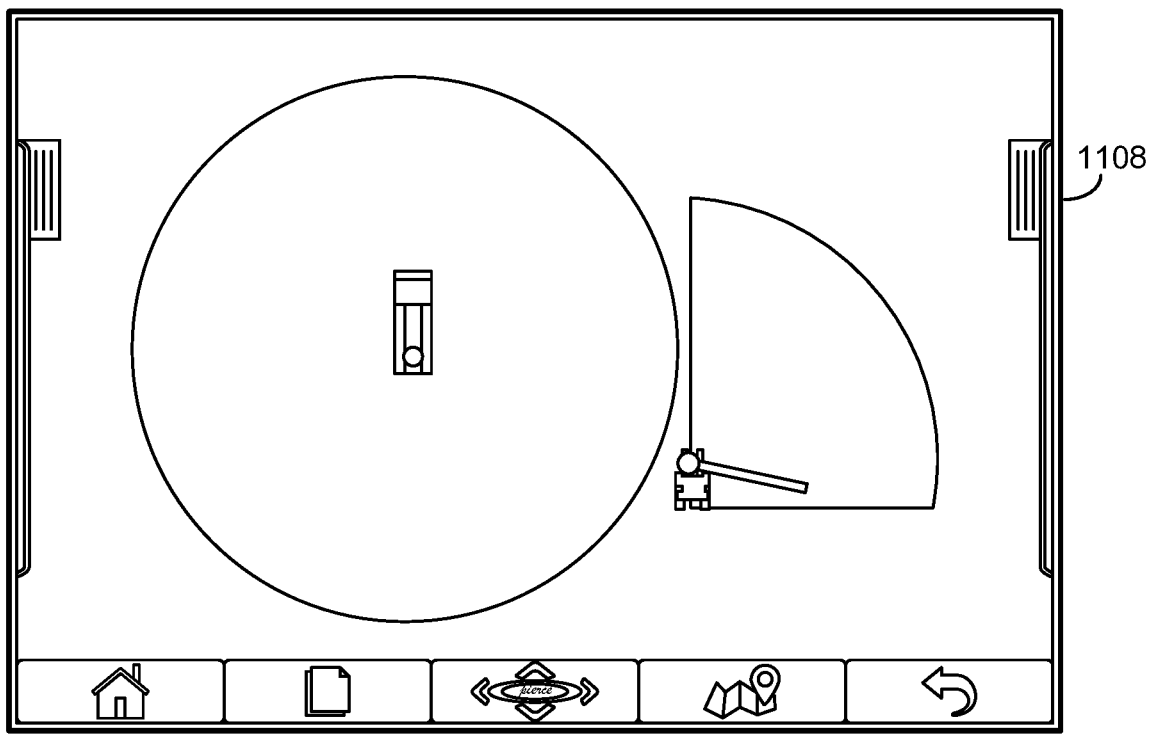

In one embodiment, display module 326 is configured to provide location information to a user. In FIG. 21, a user interface 1108 is shown that illustrates an aerial view of the response vehicle, and a circular range around the vehicle. The circle and arc area may represent an operational area of a ladder associated with a fire apparatus. In other embodiments the circle is representative of a wireless range of the response vehicle or may be representative of the coverage provided by the response vehicle (e.g., if the response vehicle is a fire truck with an attached hose, the circle may represent the range of the hose, etc.). Additional response vehicles and other objects and personnel may be shown on the user interface 1108 of FIG. 21. For example, a second response vehicle may be shown, along with the range of the second response vehicle. The user interface of FIG. 21 may be configured to display any number of vehicles, objects, and personnel that allows a user to make tactical decisions.

Figure 22:
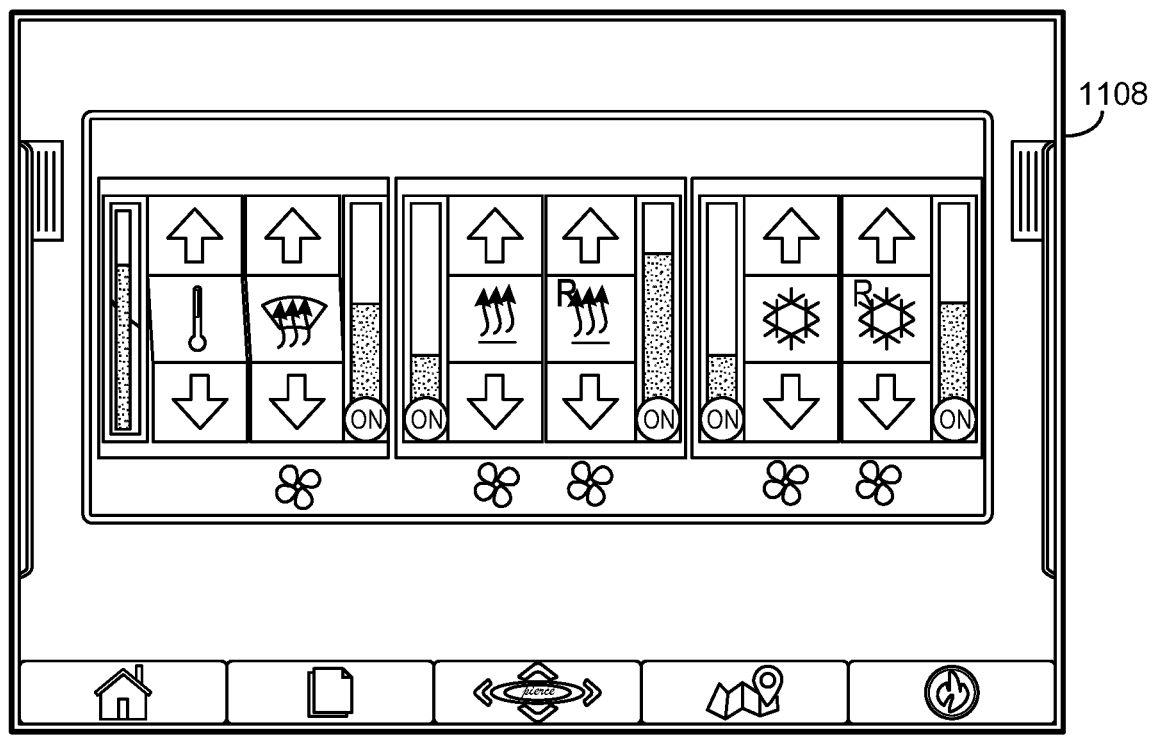

In FIG. 22, a HVAC user interface 1108 is illustrated. The user may view the status of the various HVAC units in the response vehicle and change the output of the HVAC units in any way.

Figure 23:
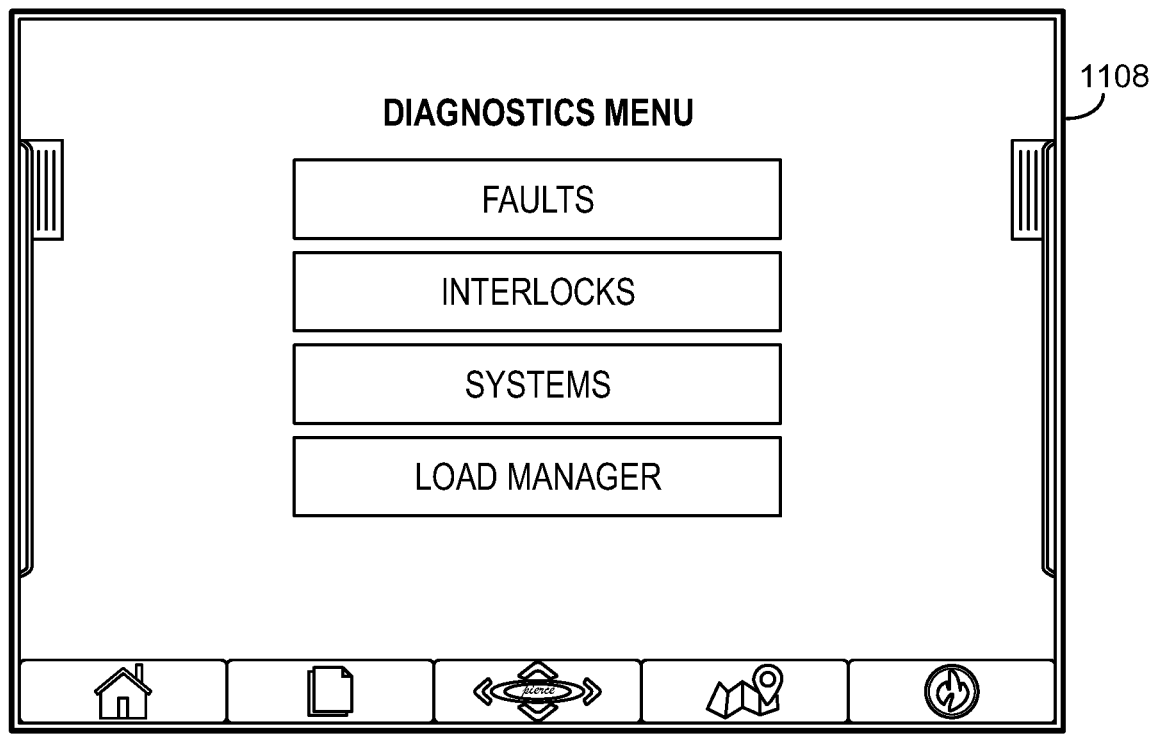

As described above, the user may select a touchable widget relating to the diagnostics menu. The user may then be presented with a menu 1108 as shown in FIG. 23. The user may then select to view one of many types of diagnostics information, such as faults, the status of vehicle interlocks (as described with reference to FIGS. 16-18), the status of various vehicle systems, and the current vehicle load (as described with reference to FIG. 15).

Figure 24:
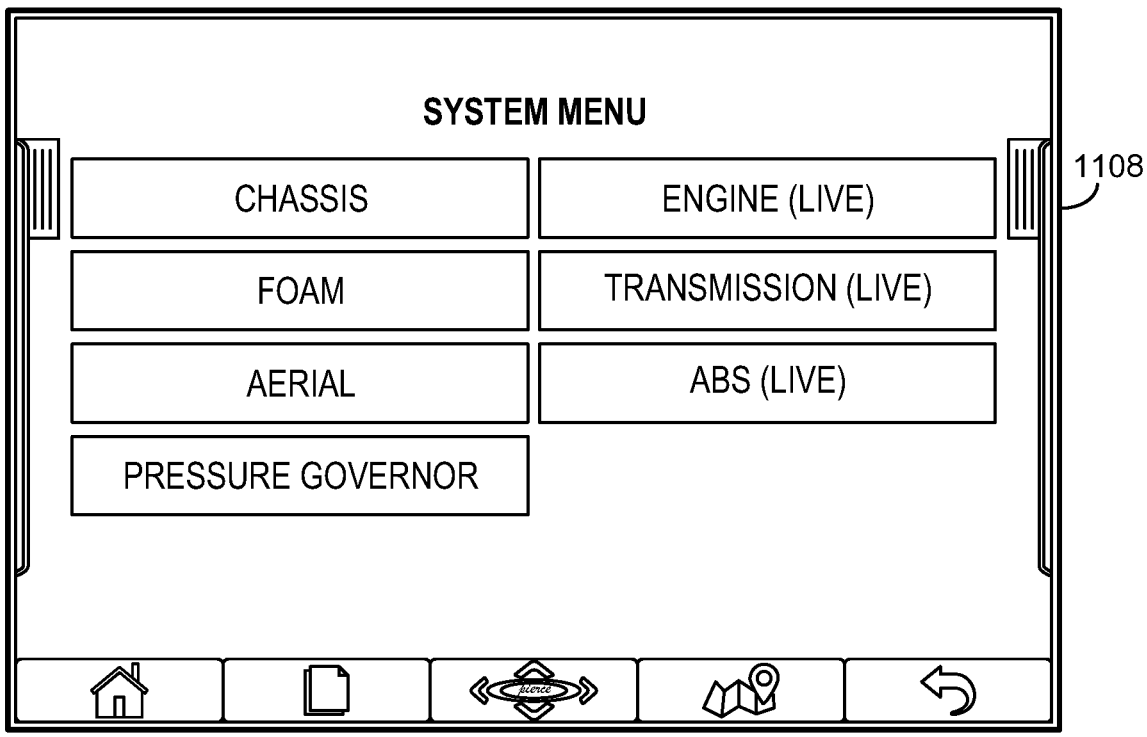
Figure 25:
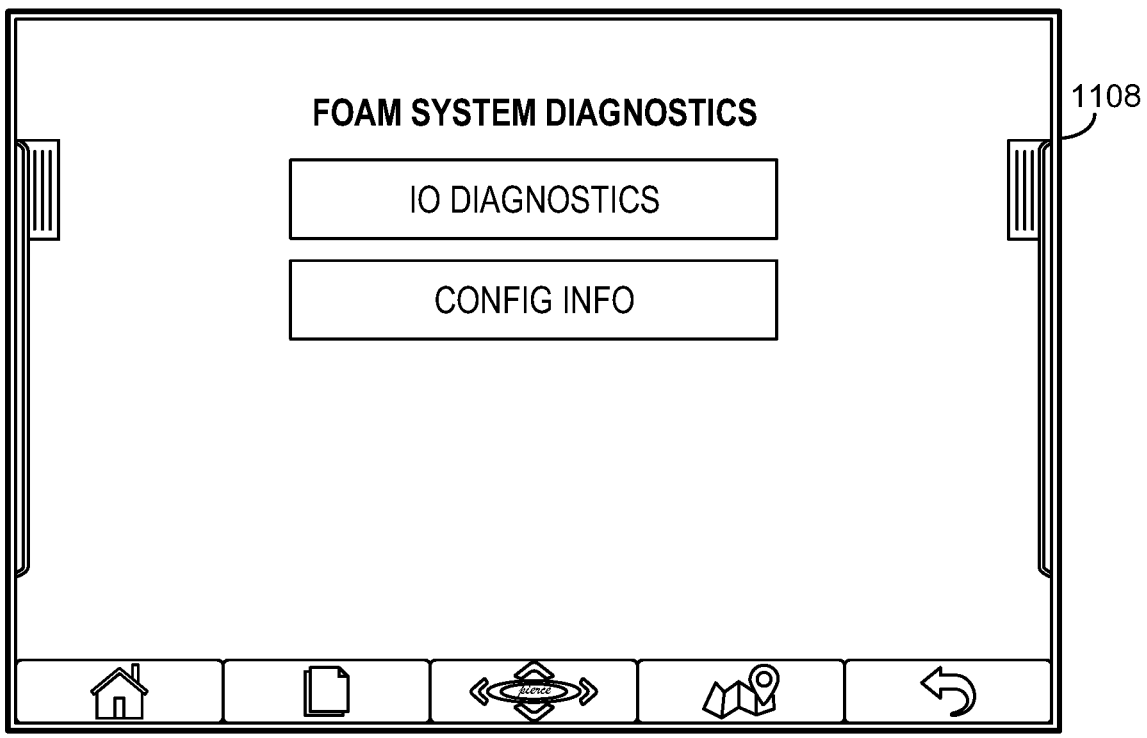
Figure 26:
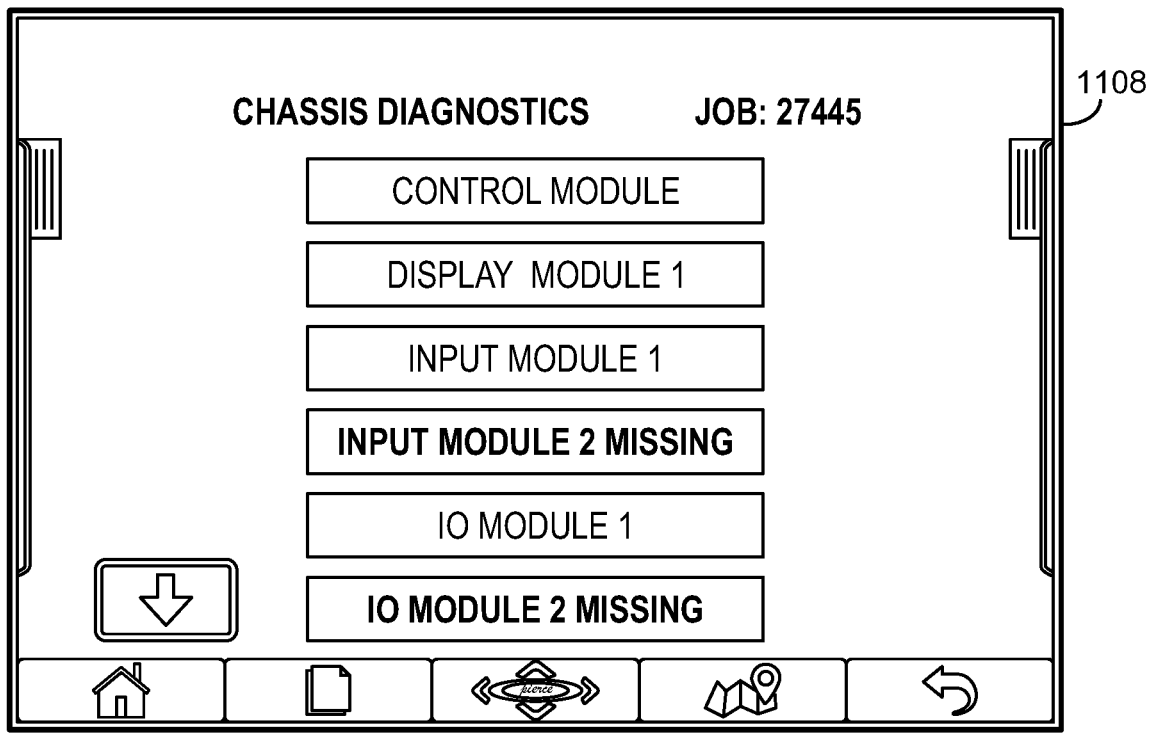
Figure 27:
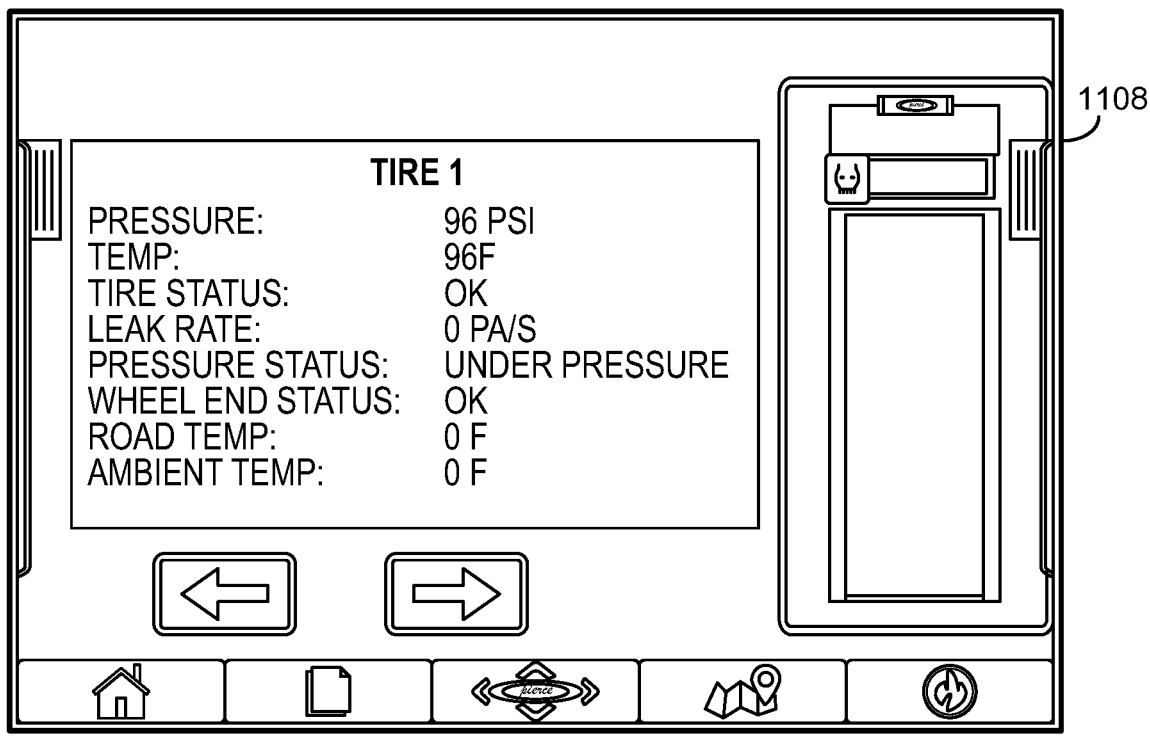

The user may select "system" to be presented with the user interface 1108 of FIG. 24. The various vehicle systems that the user may view diagnostics information for may include, for example, the chassis system, foam system (e.g., for a fire truck, etc.), aerial system (e.g., to provide a view as shown in FIG. 21, etc.), a pressure governor system, the engine, the transmission, and the ABS. The foam system diagnostics system interface 1108 is shown in FIG. 25; the chassis diagnostics system interface 1108 is shown in FIG. 26. Tire pressure information is shown in the user interface 1108 of FIG. 27.

Referring again to FIGS. 11-27, while the display is described with reference to a response vehicle, in other embodiments display module 326 may generate the features described herein for display on a mobile user device. For example, referring also to FIG. 2, the various features provided by display module 326 may be transmitted to commander 202 and/or personnel 212, allowing the commander to oversee all personnel and response vehicles at the site of an incident.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, orientations, etc.). By way of example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, by way of example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The invention claimed is:

1. A response vehicle system comprising:
a non-transitory computer-readable storage medium having instructions stored thereon that, upon execution by a processor, cause the processor to:
acquire location information relating to a location of a response vehicle;
determine whether the response vehicle has arrived at a scene based on the location information; and
provide a signal to switch the response vehicle from an operational condition to a locked condition at least in response to the response vehicle arriving at the scene, thereby preventing undesired operation of the response vehicle.

2. The response vehicle system of claim 1, wherein the instructions cause the processor to provide the signal to reconfigure a transmission of the response vehicle to switch the response vehicle from the operational condition to the locked condition.

3. The response vehicle system of claim 2, wherein the locked condition corresponds to a parking gear of the transmission, and wherein the operational condition corresponds with at least one of a neutral gear or a drive gear of the transmission.

4. The response vehicle system of claim 1, wherein the instructions cause the processor to provide the signal to reconfigure a braking system of the response vehicle to switch the response vehicle from the operational condition to the locked condition.

5. The response vehicle system of claim 4, wherein the locked condition corresponds to an engaged configuration whereby the braking system is configured to limit movement of the response vehicle, and wherein the operational condition corresponds to a disengaged configuration whereby the braking system is not configured to limit movement of the response vehicle.

6. The response vehicle system of claim 1, wherein the instructions cause the processor to provide a second signal to switch the response vehicle from the locked condition to the operational condition in response to receiving and authenticating a user unlock request.

7. The response vehicle system of claim 1, wherein the instructions cause the processor to permit operation of an engine, a siren, and a lighting system of the response vehicle while the response vehicle is in the locked condition.

8. The response vehicle system of claim 7, wherein the instructions cause the processor to permit operation of a pump and at least one of a water system or a foam system of the response vehicle while the response vehicle is in the locked condition.

9. The response vehicle system of claim 1, wherein the instructions cause the processor to switch the response vehicle from the operational condition to the locked condition in response to (i) the response vehicle arriving at the scene and (ii) receiving a user lock request from at least one of a display device, a button, a switch, a parking brake, or a wireless control interface associated with the response vehicle.

10. The response vehicle system of claim 1, wherein the instructions cause the processor to switch the response vehicle from the operational condition to the locked condition in response to (i) the response vehicle arriving at the scene and (ii) a driver door of the response vehicle being opened.

11. The response vehicle system of claim 1, further comprising the response vehicle, wherein the response vehicle includes the processor and a transceiver configured to facilitate localized wireless communication with another vehicle and a mobile device, wherein the processor is configured to:
determine if retransmission of a respective signal transmitted by a first one of the mobile device or the other vehicle is necessary for the respective signal to reach a second one of the mobile device or the other vehicle; and
retransmit the respective signal such that the respective signal reaches the second one of the mobile device or the other vehicle.

* * * * *